(12) United States Patent
Takakura et al.

(10) Patent No.: US 8,386,934 B2
(45) Date of Patent: Feb. 26, 2013

(54) INFORMATION PRESENTING APPARATUS, INFORMATION PRESENTING METHOD, AND COMPUTER PROGRAM

(75) Inventors: Hiroki Takakura, Tokyo (JP); Hiroki Masuda, Kanagawa (JP); Masatomo Kurata, Tokyo (JP); Masakazu Hayashi, Tokyo (JP); Yuji Kojima, Tokyo (JP); Yoshiki Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 762 days.

(21) Appl. No.: 12/060,656

(22) Filed: Apr. 1, 2008

(65) Prior Publication Data
US 2008/0256450 A1    Oct. 16, 2008

(30) Foreign Application Priority Data
Apr. 12, 2007 (JP) ................................. 2007-105348

(51) Int. Cl.
*G06F 3/00* (2006.01)
(52) U.S. Cl. .......... 715/723; 715/727; 715/775; 715/838
(58) Field of Classification Search .................. 715/723, 715/727, 838, 775
See application file for complete search history.

(56) References Cited

U.S. PATENT DOCUMENTS

| | | | | |
|---|---|---|---|---|
| 5,347,306 | A * | 9/1994 | Nitta ............................ | 348/14.1 |
| 7,487,524 | B2 * | 2/2009 | Miyamori ....................... | 725/34 |
| 7,594,177 | B2 * | 9/2009 | Jojic et al. ..................... | 715/720 |
| 2003/0117428 | A1 * | 6/2003 | Li et al. ......................... | 345/716 |
| 2004/0125877 | A1 * | 7/2004 | Chang et al. ............. | 375/240.28 |
| 2005/0047681 | A1 * | 3/2005 | Hori et al. ...................... | 382/305 |
| 2005/0055710 | A1 * | 3/2005 | Aoki et al. ...................... | 725/32 |
| 2005/0091596 | A1 * | 4/2005 | Anthony et al. ............... | 715/712 |
| 2007/0061735 | A1 * | 3/2007 | Hoffberg et al. .............. | 715/744 |
| 2007/0074244 | A1 * | 3/2007 | Miyamori ....................... | 725/34 |
| 2007/0250859 | A1 * | 10/2007 | Ohkita et al. ................... | 725/44 |
| 2008/0129865 | A1 * | 6/2008 | Leonard ......................... | 348/468 |
| 2008/0263471 | A1 * | 10/2008 | Hooper et al. ................. | 715/772 |
| 2010/0037179 | A1 * | 2/2010 | Ito ................................. | 715/838 |

FOREIGN PATENT DOCUMENTS

| | | |
|---|---|---|
| JP | 11-284948 | 10/1999 |
| JP | 2000-308003 | 11/2000 |
| JP | 2005-33711 | 2/2005 |
| JP | 2005-130275 | 5/2005 |
| JP | 2007-81743 | 3/2007 |

* cited by examiner

*Primary Examiner* — Ryan Pitaro
(74) *Attorney, Agent, or Firm* — Oblon, Spivak, McClelland, Maier & Neustadt, L.L.P.

(57) ABSTRACT

In an information presenting apparatus, information associated with each of one or more motion images stored in a storage apparatus is displayed at a location corresponding to a file production time in the form of a calendar view. A plurality of frames of representative images are extracted from each motion image in accordance with a specified frame extraction method. Thumbnail images of the respective extracted representative images are produced, and each thumbnail image is related to a playback position in the motion image. The resultant thumbnail images are managed as a set of motion image thumbnail images in accordance with a production time of the motion image. Information associated with each motion image is displayed at a location corresponding to the production time of the motion image in the form of the calendar view. Thumbnail images associated with each motion image are displayed in an expanded form in the order of time.

16 Claims, 27 Drawing Sheets

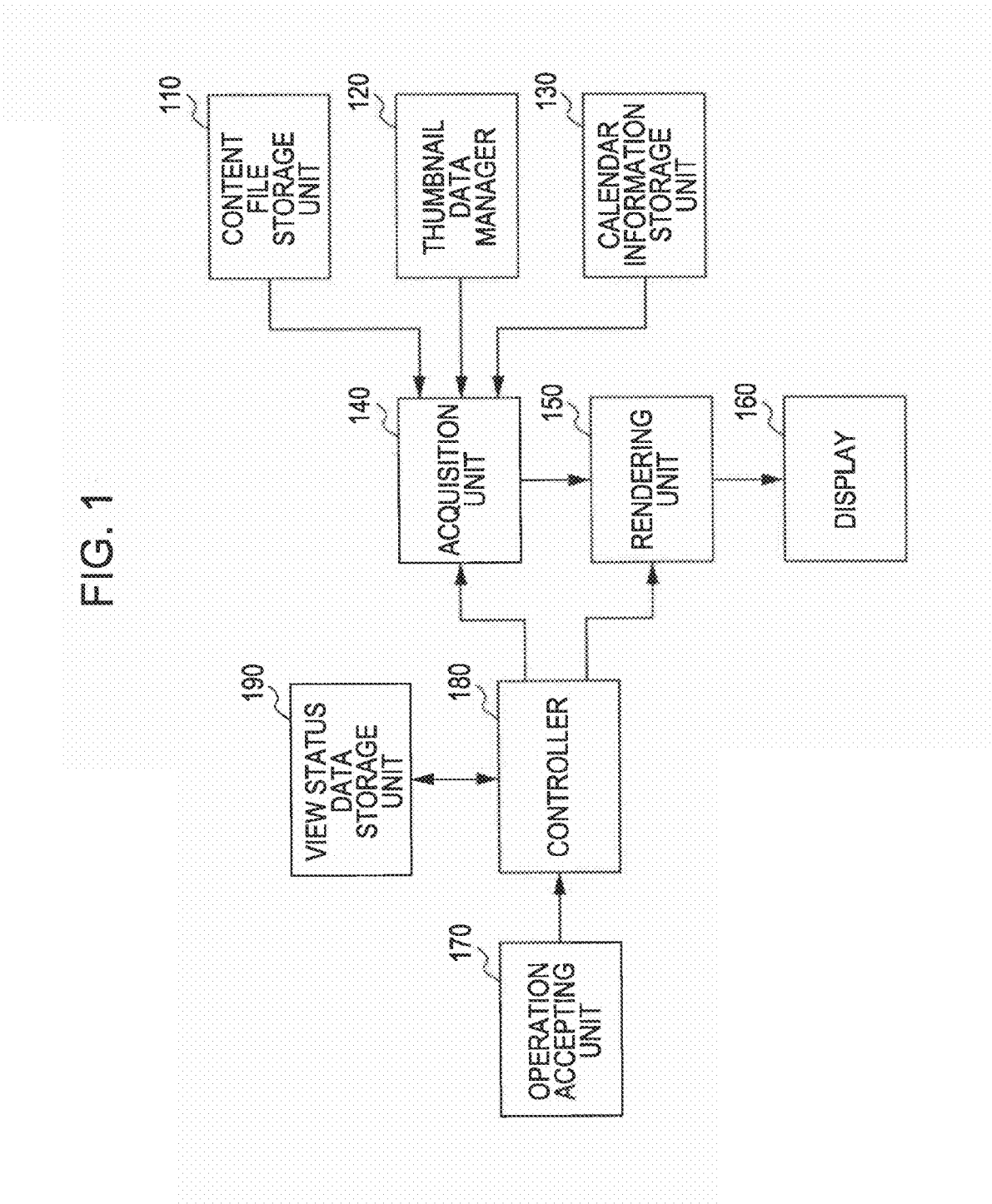

FIG. 2A

| | | | |
|---|---|---|---|
| Jan. | Feb. | Mar. | Apr. |
| May | Jun. | Jul. | Aug. |
| Sept. | Oct. | Nov. | Dec. |
| Jan. | Feb. | Mar. | Apr. |
| May | Jun. | Jul. | Aug. |
| Sept. | Oct. | Nov. | Dec. |
| Jan. | Feb. | Mar. | Apr. |
| May | Jun. | Jul. | Aug. |
| Sept. | Oct. | Nov. | Dec. |

| | | | 12 | | | |
|---|---|---|---|---|---|---|
| 28 | 29 | 30 | 1 | 2 | 3 | 4 |
| 5 | 6 | 7 | 8 | 9 | 10 | 11 |
| 12 | 13 | 14 | 15 | 16 | 17 | 18 |
| 19 | 20 | 21 | 22 | 23 | 24 | 25 |
| 26 | 27 | 28 | 29 | 30 | 31 | 1  1 |
| 2 | 3 | 4 | 5 | 6 | ☐ 7 | ☐ 8 |
| ☐ 9 | 10 | 11 | 12 | 13 | 14 | 15 |
| 16 | 17 | 18 | 19 | 20 | 21 | 22 |
| 23 | 24 | 25 | 26 | 27 | 28 | 29 |
| 30 | 31 | 2  1 | 2 | 3 | 4 | 5 |
| 6 | 7 | 8 | 9 | 10 | 11 | 12 |
| 13 | 14 | 15 | 16 | 17 | 18 | 19 |
| 20 | 21 | 22 | 23 | 24 | 25 | 26 |
| 27 | 28 | 3  1 | 2 | 3 | 4 | 5 |

521 — outer calendar region
520 — highlighted device region
524 — marker box

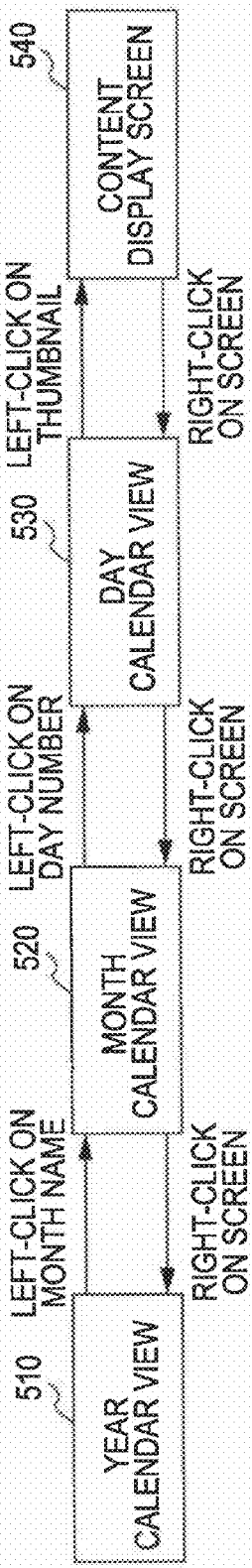
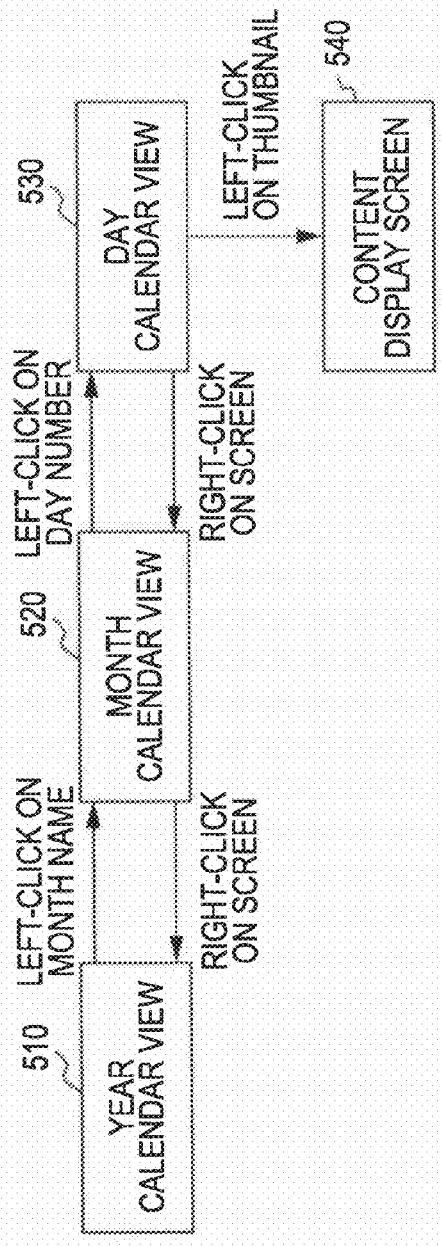
FIG. 4A
FIG. 4B

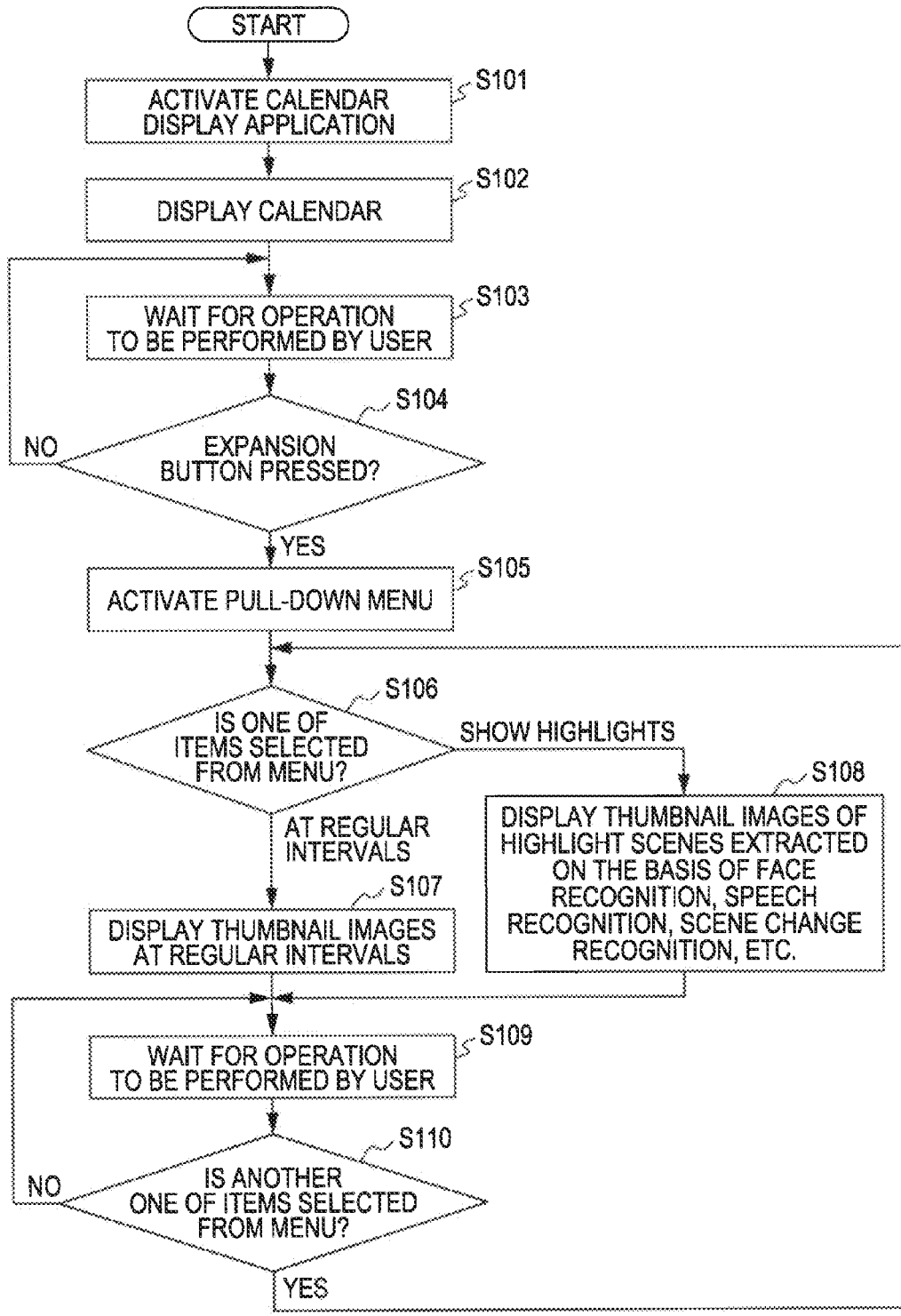

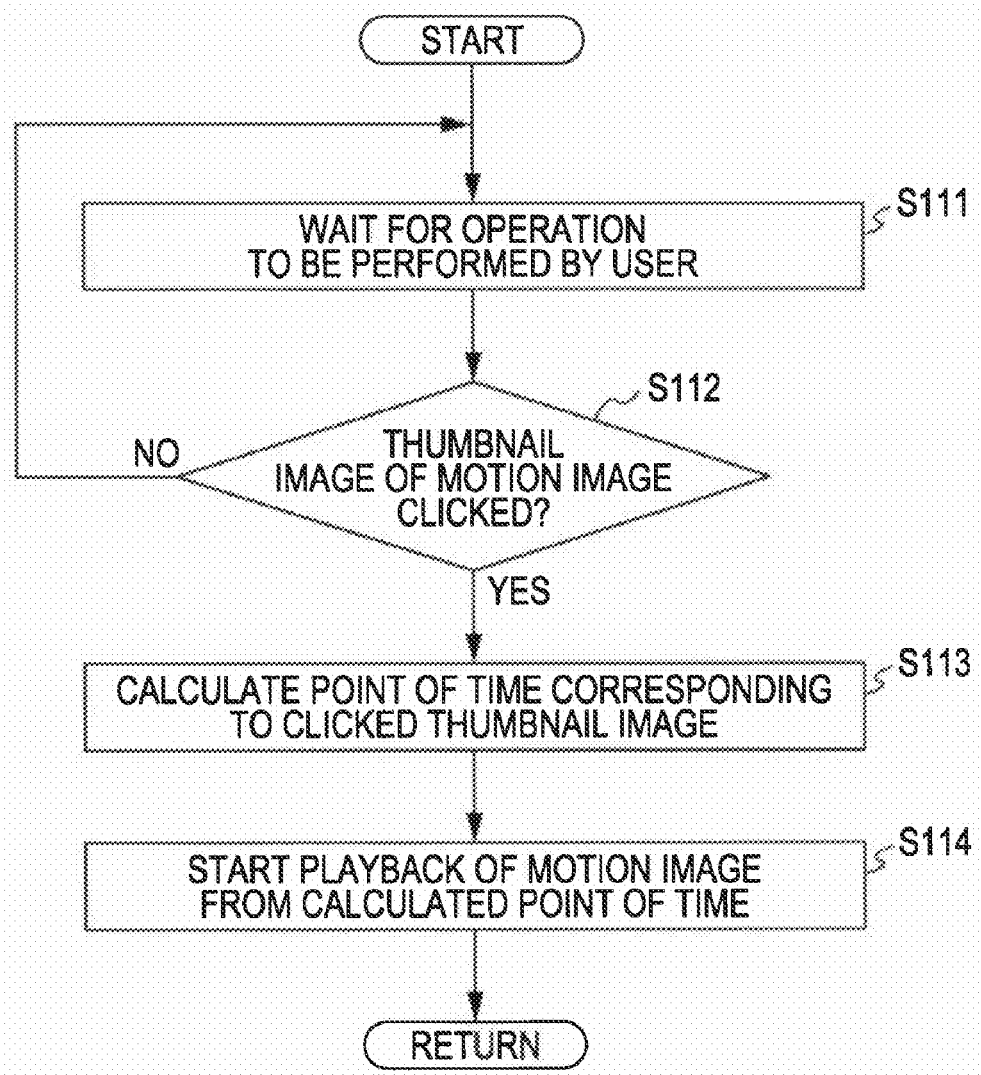

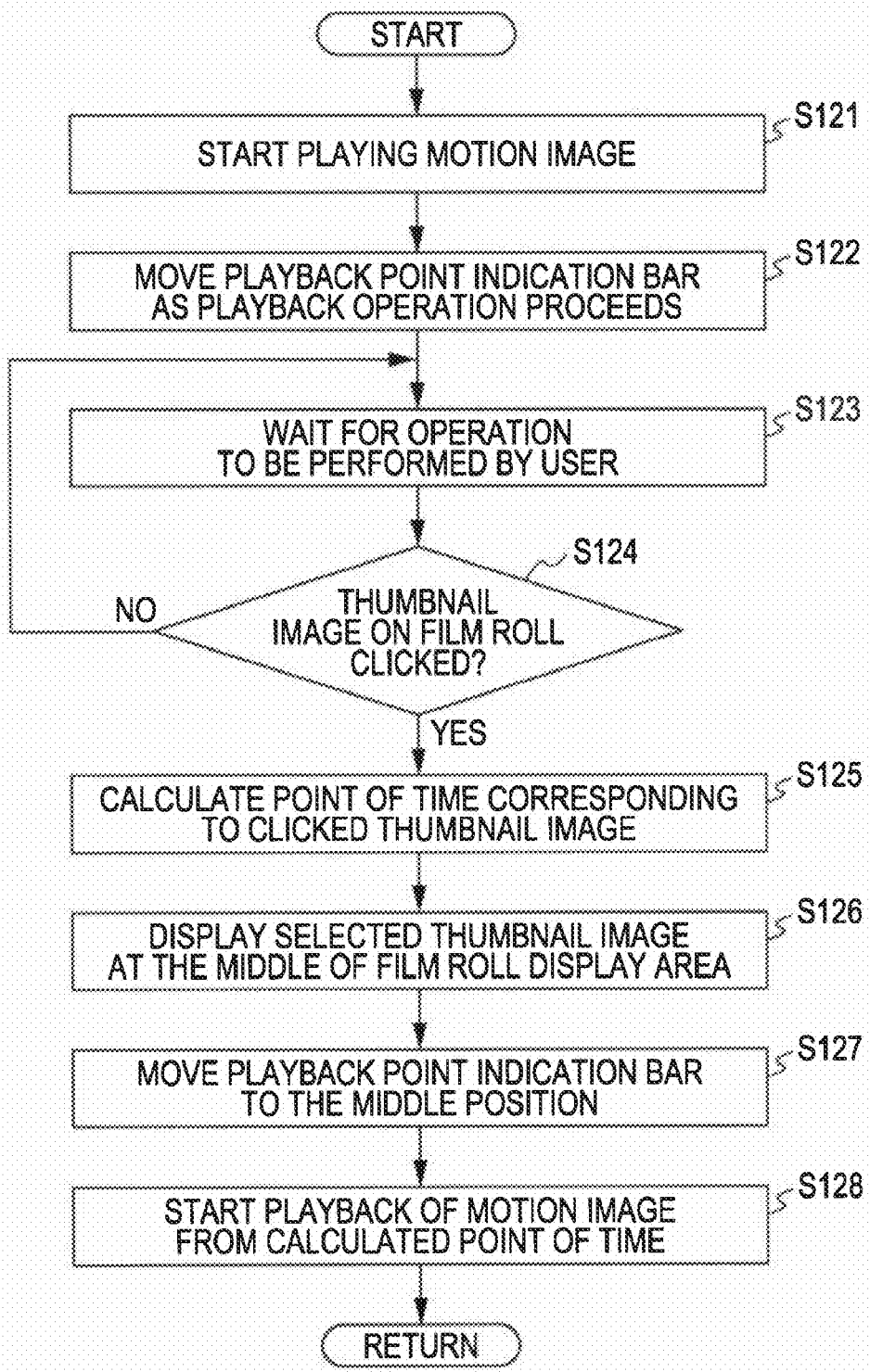

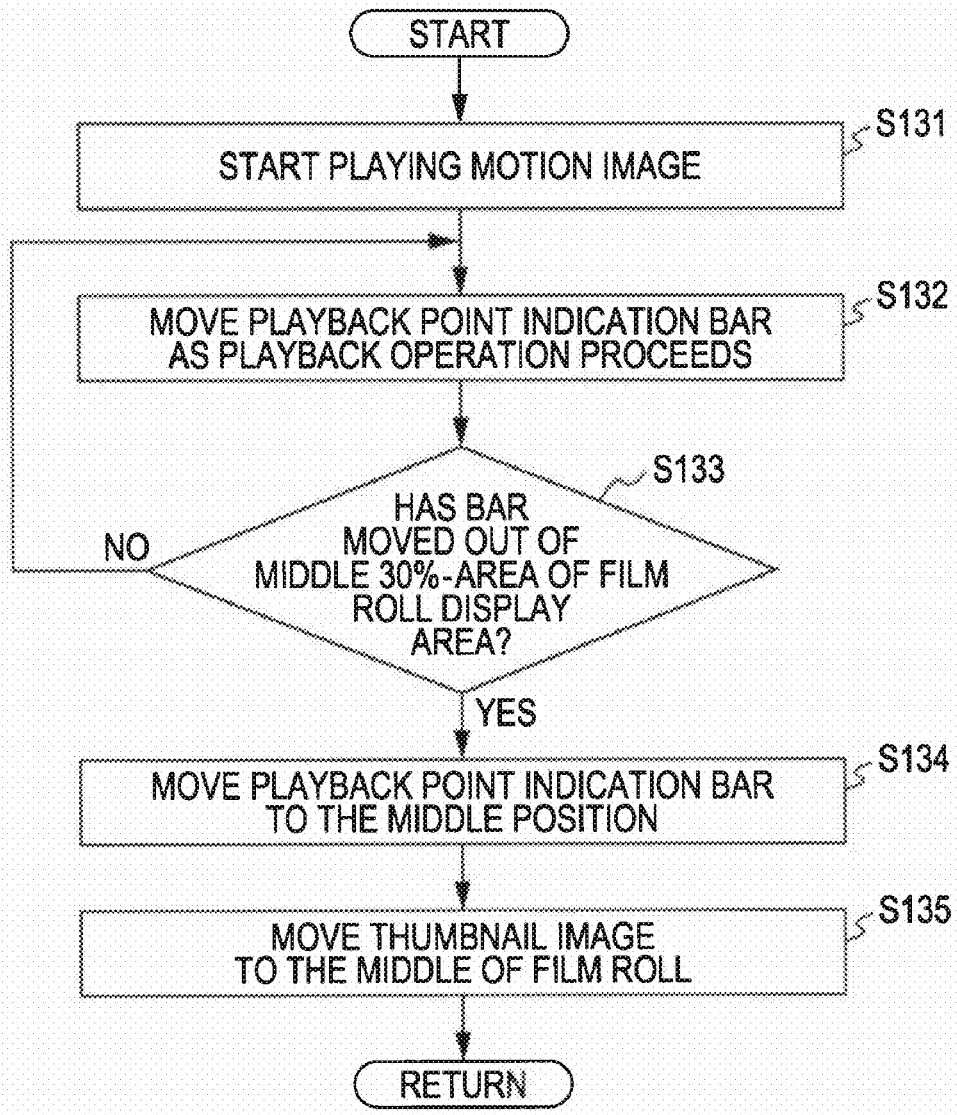

INFORMATION PRESENTING APPARATUS, INFORMATION PRESENTING METHOD, AND COMPUTER PROGRAM

CROSS REFERENCES TO RELATED APPLICATIONS

The present invention contains subject matter related to Japanese Patent Application JP 2007-105348 filed in the Japanese Patent Office on Apr. 12, 2007, the entire contents of which are incorporated herein by reference.

BACKGROUND OF THE INVENTION

1. Field of the Invention

The present invention relates to an information presenting apparatus, an information presenting method, and a computer program, adapted to manage information associated with each of one or more files stored in storage means and present the information to a user, and more particularly, to an information presenting apparatus, an information presenting method, and a computer program, adapted to manage information associated with each of one or more content files of still images or motion images taken by a digital camera or the like and present the information to a user.

More specifically, the present invention relates to an information presenting apparatus, an information presenting method, and a computer program, adapted to present one or more content files of still images or motion images taken by a digital camera or the like depending on the date/time of taking images or updating files, and more particularly, to an information presenting apparatus, an information presenting method, and a computer program, adapted to present one or more representative images of content files in a calendar view in accordance with the date/time of producing the content files.

2. Description of the Related Art

Nowadays, many people enjoy producing a content file (a still image file, a motion image file, an audio file, etc.) using a digital image recording apparatus such as a digital still camera or a digital video camera.

In many cases, an image taken by a digital still/video camera is transferred to a host apparatus such as a personal computer (PC) and is stored as a content file therein. In many cases, a large number of content files are stored and managed in the host apparatus. However, in the case where a large number of content files are stored, it is generally difficult for a user to well manage all content files, and thus some content files are forgotten without being used. The great power of a computer allows a user to handle a huge number of contents. This is very useful for users on the one hand, while on the other hand, this leads to difficulty in managing contents. Thus, it is desirable to provide a technique to allow a user to easily find an image from a huge number of images the user has shot.

One technique to provide a visual key or clue to a desired content is to use a view format in which contents are placed according to where, why, what, when, who, and/or how the contents were acquired/taken. In context analysis performed by a user, the analysis is based on the place, the reason, the time, the manner, and/or the like of a content, and thus mapping of contents on the view format in accordance with the place, the reason, the time, the manner, and/or the like of subjects makes it possible for the user to easily manage and find a desired content.

A specific example of such a view format is a calendar view format having day boxes arranged in the form of an array having seven columns assigned to respective days of the week. In this format, contents are placed in day boxes according to the date of contents. More specifically, for example, content files stored in an information processing apparatus are managed by displaying representative images of content files in a calendar view in accordance with the year, the month, the day, and/or the time at which the content files were produced (see, for example, Japanese Unexamined Patent Application Publication No. 2005-33711 (FIG. 31)).

When a list of images is displayed in such a calendar view format, a calendar is displayed as a background image, and thumbnail images representative of motion images or sill images are displayed on the calendar at locations corresponding to the date when the motion/still images were shot thereby presenting information associated with the motion/still images in a seamless manner in terms of time. A GUI (Graphical User Interface) can be realized using such a calendar view format. On the calendar view serving as such a GUI, if a user clicks on a particular thumbnail image, a content file corresponding to the clicked thumbnail image is selected and playback of the content is started in a full size. Note that not the thumbnail image but the original full-size content is played back. In a case where a content corresponding to a selected thumbnail image is a motion image, the motion image is played back starting from its beginning.

Because the screen size is limited, it is reasonable to use thumbnail images to present information associated with a large number of image files at a time on the screen with the limited size. For still images, presenting the information using thumbnail images allows a user to recognize subjects and backgrounds of the corresponding original images, although the amount of information given by the thumbnail images is less than that of the original images.

In the case of motion images, presenting information associated with each motion image using a single thumbnail image (for example, a thumbnail image of a first frame of the motion image) does not allow a user to easily understand the content of the motion image. Besides, because a single thumbnail image is used as a representative image of each motion image regardless of whether the motion image is long or short, it is difficult to get information about the length of motion images from the calendar view, although the calendar view provides information about the date/time when motion images were shot.

Thus, to get information about the content of a motion image, a user has to play back the motion image. This is troublesome for the user, and it takes a long time. Basically, to get information about the content of a motion image, as long a time as the length of the motion image is needed.

In general image playback tools, it is possible to seek within a motion image by moving a knob on a scroll bar indicating the current playback position in time of the motion image. However, for a motion image including a particular scene that a user wants to see, although the user does not completely understand the content of the motion image, it is difficult for the user to determine where the user can find the target scene in seeking. In other words, it is necessary to continue seeking until the target scene appears.

SUMMARY OF THE INVENTION

In view of the above, it is desirable to provide an information presenting apparatus, an information presenting method, and a computer program, capable of managing information associated with a content file of a still image or a motion image taken by a digital camera or the like and presenting the information to a user in a proper manner.

It is also desirable to provide an information presenting apparatus, an information presenting method, and a computer program, capable of presenting a content file of a still image or a motion image taken by a digital camera or the like depending on a date/time of taking an image or updating a file.

It is also desirable to provide an information presenting apparatus, an information presenting method, and a computer program, capable of presenting a representative image of a content file in a calendar view in accordance with a date/time of producing the content file.

It is also desirable to provide an information presenting apparatus, an information presenting method, and a computer program, adapted to present a list of motion images in a calendar view in such a manner that a user can easily understand the content of each motion image from presented information.

In view of the above, according to an embodiment of the present invention, there is provided an information presenting apparatus adapted to present, to a user, information associated with each of one or more motion images stored in a storage apparatus by displaying the information at a location corresponding to a file production time on a background image in the form of a calendar view, comprising frame extraction means for extracting a plurality of frames serving as representative images from a motion image in accordance with a specified frame extraction method, motion image thumbnail image management means for producing thumbnail images of the respective extracted representative images, relating each thumbnail image to a playback position in the motion image, and managing the thumbnail images as a set of motion image thumbnail images in accordance with a production time of the motion image, and image drawing means for drawing information associated with each motion image stored in the storage apparatus, at a location corresponding to the production time of the motion image, on the background image in the form of the calendar with a calendar continuing across boundaries of years, months, and days, wherein when the image drawing means presents the information associated with each motion image stored in the storage apparatus on the background image in the form of the calendar view, the image drawing means draws thumbnail images belonging to the set of motion image thumbnail images associated with each motion image in an expanded form in which the thumbnail images are located in the order of time.

Presenting information associated with content files such as motion/still image files in the calendar view format provides a user interface that allows a user to easily access a desired content file. More specifically, in the calendar view format, a calendar is displayed as a background image, and thumbnail images representative of motion/sill images are displayed on the calendar at locations corresponding to the date when the motion/still images were shot thereby presenting information associated with the motion/still images in a seamless manner in terms of time. If a user selects one of displayed thumbnail images, playback of a content file corresponding to the selected thumbnail image is started.

The information presenting apparatus is capable of setting the time range of the calendar view to one year, one month, or one day (or one hour), switching the background calendar view into a year calendar view, a month calendar view, or day calendar view depending on the selected time range, and displaying thumbnail images representative of content files at locations corresponding to content production date in the calendar view.

When information associated with each motion image is presented to a user in the calendar view format, if only a single thumbnail image of a first frame of each motion image is used as a representative image of the motion image, it is very difficult for the user to understand the content of each motion image. Besides, because only one thumbnail image is presented regardless of whether a corresponding motion image is short or long, it is difficult for the user to determine the length of each motion image from the thumbnail image displayed in the calendar view, although it is easy to get information about the date/time when each motion image was shot. Furthermore, viewing only one thumbnail image of the start frame does not provide any clue or key based on which to seek for a particular scene in the motion image, and thus it takes a long time for the user to understand the content of the motion image file by performing seeking over the entire motion image file.

In the information presenting apparatus, to avoid the above problems, a plurality of frames serving as representative images are extracted from each motion image in accordance with a specified frame extraction method, thumbnail images are produced from the respective extracted representative frames, each thumbnail image is related to the playback position in the motion image, and the thumbnail images of each motion image are manages as a set of motion image thumbnail images assigned to the motion image.

The information presenting apparatus may further include operation accepting means for accepting an operation performed by a user. By using the operation accepting means, the user is allowed to perform a toggling operation to switch the mode in which thumbnail images are displayed. The image drawing means may draw thumbnail images such that when the information associated with each motion image stored in the storage apparatus is presented on the background image in the form of the calendar view, the image drawing means draws thumbnail image such that a single thumbnail image associated with a motion image is expanded into a plurality of thumbnail images included in a set of motion image thumbnail images associated with the motion image or such that a plurality of expanded motion image thumbnail images are collapsed into a single thumbnail image, depending on a thumbnail image display mode specified by the user via the operation accepting means. Thus, when the user wants to know the content of a particular motion image, the user can expand the thumbnail image corresponding to the motion image into a plurality of thumbnail images included in the set of motion image thumbnail images assigned to the motion image whereby the user can easily understand the content of the motion image.

The information presenting apparatus may further include frame extraction method specifying means for specifying a method of extracting frames of representative images from a motion image. The frame extraction method specifying means may be adapted to specify at least one of methods including a method of extracting frames of representative images at regular intervals from a motion image, and a method of extracting frames of highlight scenes from the motion image. The frame extraction means may extract a plurality of frames of representative images from the motion image in accordance with the specified extraction method.

The information presenting apparatus may further include motion image playback means for, in response to selecting one of displayed thumbnail images by a user via the operation accepting means, playing back a motion image starting from a playback position corresponding to the selected thumbnail image. That is, if the user selects one of the displayed thumbnail images, the motion image is played back starting from the playback position corresponding to the selected thumbnail image. This makes it possible for the user to easily seek within the motion image.

When the image drawing means draws thumbnail images included in a set of motion image of thumbnail images in the expanded manner in the order of time, the image drawing means may draw the thumbnail images in the form of a film roll along which the thumbnail images included in the set of motion image thumbnail images are expanded in the order of time. When a single thumbnail image is expanded, the image drawing means may expand the thumbnail image into a plurality of thumbnail images in the form of an animation indicating a manner in which the film roll expands, so that a user can easily understand the progress of the expansion process.

According to another embodiment of the present invention, there is provided a computer program executable by a computer to perform a process of presenting, to a user, information associated with each of one or more motion images stored in a storage apparatus by displaying the information at a location corresponding to a file production time on a background image in the form of a calendar view, the process comprising the steps of extracting a plurality of frames serving as representative images from a motion image in accordance with a specified frame extraction method, managing motion image thumbnail images, by producing thumbnail images of the respective extracted representative images, relating each thumbnail image to a playback position in the motion image, and managing the thumbnail images as a set of motion image thumbnail images in accordance with a production time of the motion image, and drawing an image of information associated with each motion image stored in the storage apparatus, at a location corresponding to the production time of the motion image, on the background image in the form of the calendar with a calendar continuing across boundaries of years, months, and days, wherein in the image drawing step, when the information associated with each motion image stored in the storage apparatus is presented on the background image in the form of the calendar view, the thumbnail images belonging to the set of motion image thumbnail images associated with the motion image are expanded in the order of time.

Note that the computer program is described in a computer-readable form to define the computer program to be executed to perform the above-described process on a computer. More specifically, the computer program is installed on a computer and the functions similar to those of the information presenting apparatus are realized on the computer by a cooperation between the computer program and the computer.

As described above, the present invention provides great advantages. That is, the present invention provides the information presenting apparatus, the information presenting method, and the computer program, capable of presenting a representative image of a content file in a calendar view in accordance with a date/time of producing the content file.

In the information presenting apparatus, a plurality of thumbnail images of a motion image are expanded in the order of time along a film roll on the list-of-images view screen in the form of the calendar view, thereby providing a great improvement in ease of finding/identifying desired images. Thus, a user can easily understand the content and the length of each motion image without having to play back the motion image.

In the information presenting apparatus, if a user selects one thumbnail image from expanded thumbnail images of a motion image, the motion image is played back from a playback position corresponding to the selected thumbnail image. This allows the user to easily specify the playback position of the motion image, and also allows the user to make the playback position jump to another arbitrary playback position during the playback operation.

Further objects, features, and advantages of the present invention will become apparent from the following description of exemplary embodiments with reference to the accompanying drawings.

BRIEF DESCRIPTION OF THE DRAWINGS

FIG. 1 is a diagram illustrating an example of a configuration of an information presenting apparatus according to an embodiment of the present invention;

FIG. 2A is a diagram illustrating an example of a format of a presentation screen for presenting content files in a case where one year is selected as an unit of time range;

FIG. 2B is a diagram illustrating an example of a format of a presentation screen for presenting content files in a case where one month is selected as an unit of time range;

FIG. 4A is a diagram illustrating an example of a manner in which a view form is switched on a single screen (a window screen) among a plurality of forms including a one-year calendar view and a content display screen;

FIG. 4B is a diagram illustrating an example of a manner in which a view form is switched among a plurality of forms such that a content display screen is opened as a separate window screen;

FIG. 22 is a flow chart illustrating a process of expanding a set of thumbnail images of a motion image in the order of time on a list-of-images view screen in the form of a calendar view;

FIG. 23 is a flow chart illustrating a process of starting playback of a motion image;

FIG. 24 is a flow chart illustrating a process of playing back a motion image; and FIG. 25 is a flow chart illustrating a process of advancing a current playback point indicator during a motion image playback operation.

DESCRIPTION OF THE PREFERRED EMBODIMENTS

Figure 2C:
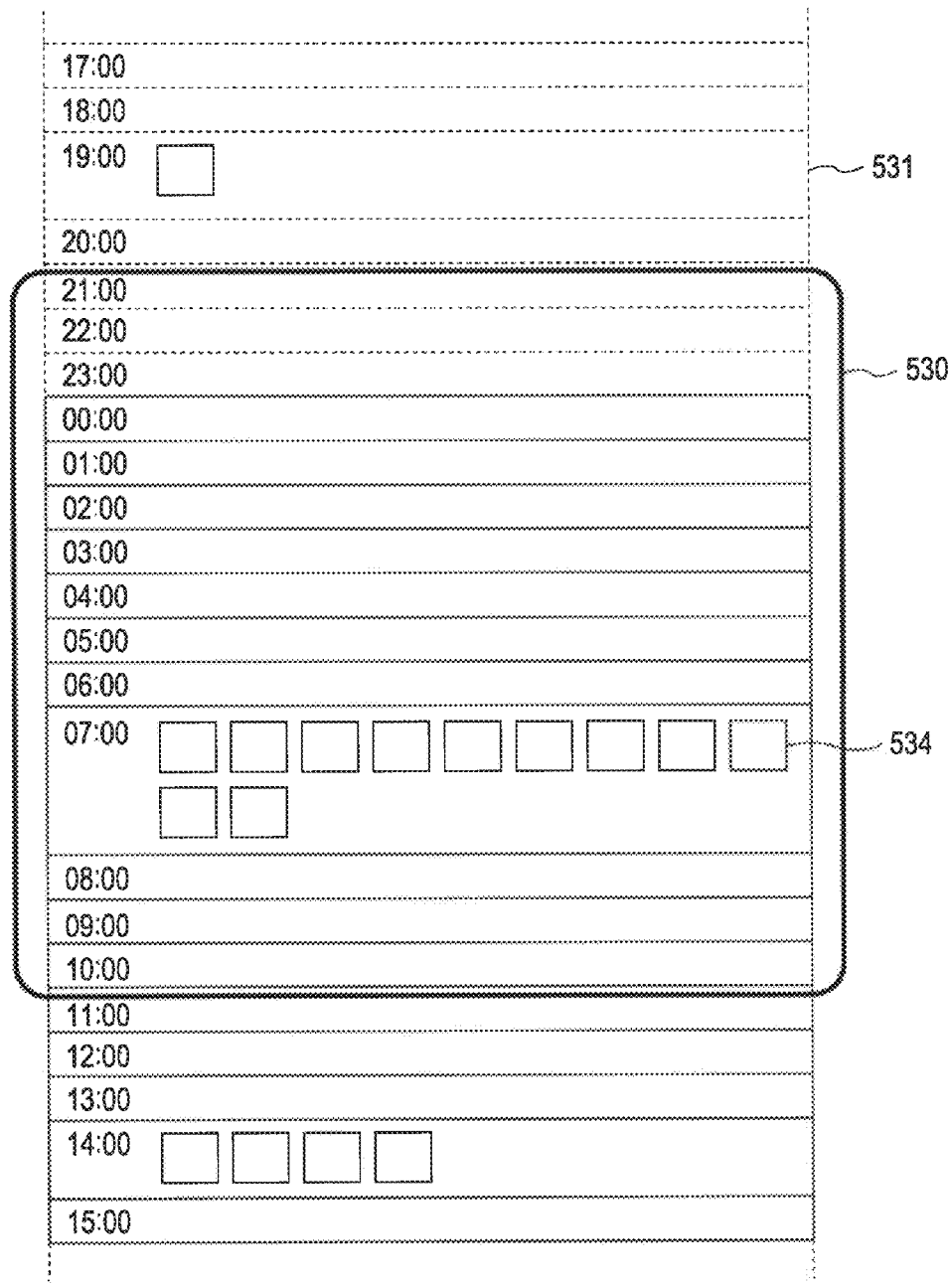
FIG. 2C is a diagram illustrating an example of a format of a presentation screen for presenting content files in a case where one day is selected as an unit of time range.

The present invention is described in further detail below with reference to embodiments in conjunction with the accompanying drawings.

FIG. 1 illustrates an example of a configuration of an information presenting apparatus according to an embodiment of the present invention. This information presenting apparatus includes a content file storage unit 110, a thumbnail data manager 120, a calendar information storage unit 130, an acquisition unit 140, an image drawing unit 150, a display 160, an operation accepting unit 170, a controller 180, and a view status data storage unit 190. Those parts of the information presenting apparatus are described in detail below part by part.

The content file storage unit 110 is adapted to store content files of various types such as a still image file, a motion image file, and an audio file. In the content file storage unit 110, attribute information indicating a file production time or the like is also stored as metadata for each content file. The production time is represented by a set of year, month, day, and time or by a subset thereof.

The thumbnail data manager 120 produces thumbnail image of each content file stored in the content file storage unit 110, and stores the resultant thumbnail image as a representative image of the content file. It is desirable that the thumbnail data manager 120 store thumbnail image in association with the time of producing a corresponding content file thereby to allow thumbnail image to be quickly found and read by using the content file production time as a search key.

For a still image file, the thumbnail data manager 120 may employ a reduced image thereof as thumbnail image. For an audio file, a visual effect image at a particular time may be used as thumbnail image.

For a motion image file, the thumbnail data manager 120 may employ a reduced image of a frame at a particular point of time as thumbnail image. It may be allowed to use only thumbnail data corresponding to a starting frame of a motion image. Instead, in the present embodiment, a plurality of representative image frames are extracted from different points of a motion image, thumbnail images are produced from the respective extracted representative frames, each thumbnail image is related to the playback position in the motion image, and the thumbnail images of each motion image are manages as a set of motion image thumbnail images assigned to the motion image. A set of motion image thumbnail image may be displayed in an expanded fashion in the order of time in the calendar view so that a user can easily understand the content of the motion image. If the user selects one of the displayed thumbnail images, the motion image may be played back starting from the point corresponding to the selected thumbnail image. Thus a user interface is provided which allows a user to easily manage content files.

Representative image frames may be extracted from a motion image in many ways. A first method is to simply extract frames at regular intervals (specified by a user). A second method is to extract highlight scenes such as a scene including a face of an important person, a frame at which a scene change occurs, a frame at which zooming occurs, etc., detected according to an evaluation function of video data and/or audio data. Using the operation accepting unit 170, a user is allowed to specify a method of extracting representative image frames from a motion image. Some examples of methods of extracting highlight images from a motion image may be found, for example, in Japanese Patent Application No. 2006-60592 or Japanese Patent Application No. 2006-115242 both assigned to the applicant of the present invention.

The calendar information storage unit 130 stores information (calendar information) necessary to produce a calendar. For example, the calendar information includes information indicating the correspondence between dates and days of the week, information indicating public holidays, information indicating leap years, etc.

The acquisition unit 140 accesses the content file storage unit 110, the thumbnail data manager 120, or the calendar information storage unit 130 to acquire data therefrom.

The image drawing unit 150 creates a background image of the calendar view in accordance with the calendar information stored in the calendar information storage unit 130 and further creates thumbnail images at corresponding positions on the calendar view background image in accordance with the thumbnail image stored in the thumbnail data manager 120. When playback of a content file is requested by clicking on a corresponding thumbnail image, the image drawing unit 150 creates an image to be displayed according to the content file.

In the present embodiment, for a motion image file, the image drawing unit 150 acquires, via the acquisition unit 140, a set of thumbnail images of a motion image specified by a user, and displays the acquired set of thumbnail images in the expanded form at a location corresponding to the production date/time on a calendar view in the order of time. The details will be described later in terms of an interface by which a set of thumbnail images of a motion image is displayed and a particular scene is sought for using the set of thumbnail images.

The display 160 is a device adapted to display an image in accordance with data produced by the image drawing unit 150. The display 160 may be, for example, a LCD (Liquid Crystal Display) device.

The operation accepting unit 170 is a device adapted to accept an operation performed by a user. The operation accepting unit 170 may include, for example, a pointing device such as a mouse and/or a touch panel. The operation accepting unit 170 may be configured in a form in which a touch panel is integrated on the display 160.

A user is allowed to control the list-of-images view screen in the form of a calendar view via the operation accepting unit 170. Allowable operations include, for example, an operation to specify a method of extracting representative image frames from a motion image, an operation to issue an expansion command to expand a current single thumbnail image of a motion image into a plurality of thumbnail images extracted from the motion image, an operation to issue a collapse command to collapse a plurality of thumbnail images of a motion image into a single thumbnail image, and an operation to issue a playback command to play back a motion image starting from a point corresponding to a thumbnail image selected by the user.

The controller 180 controls the acquisition unit 140 and the image drawing unit 150 in accordance with an operation accepted via the operation accepting unit 170. More specifically, the controller 180 controls the acquisition unit 140 to acquire calendar information and thumbnail data necessary in the drawing process, and controls the image drawing unit 150 to draw thumbnail images at respective positions in the calendar view on the list-of-images view screen in accordance with the information and data acquired by the acquisition unit 140. When a playback of a particular content file is requested, the controller 180 controls the image drawing unit 150 to draw an image of the specified content file.

The view status data storage unit 190 stores view status data indicating a current time range and a current point of a calendar. The time range may be selected from one year, one month, or one day. The point may be indicated by a set of a year, a month, a day, and a time. When a user issues a command to change the time range via the operation accepting unit 170, the time range is switched while maintaining the current point on the basis of the view status data stored in the view status data storage unit 190.

The information presenting apparatus shown in FIG. 1 is actually realized by executing an application program on a general-purpose computer system such as a personal computer (PC) thereby to manage files in a folder structure and present content files in the calendar view. The information presenting apparatus may operate as a USB (Universal Serial Bus) host device capable of acquiring a content file such as a still image file, a motion image file, or an audio file from a content recording apparatus (not shown) such as a digital camera serving as a USB slave device connected to the information presenting apparatus.

FIGS. 2A to 2C illustrate some examples of calendar views in which to present content files.

Figure 3:
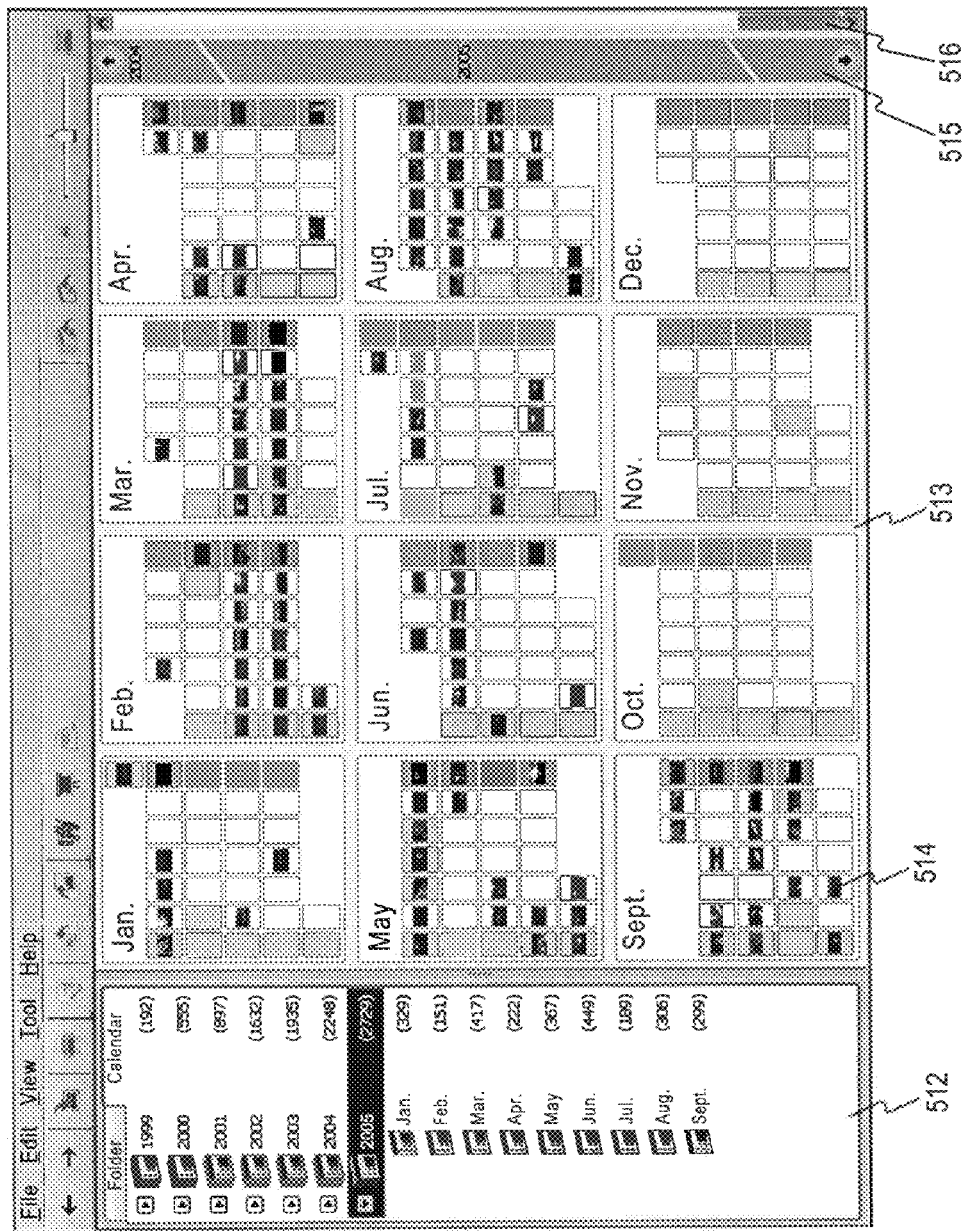
FIG. 3 is a diagram illustrating an example of a manner in which representative thumbnail images of days are displayed in the form of a one-year calendar view having month boxes.

FIG. 2A illustrates an example of a calendar view in which content files are presented, for a case where one year is selected as the time range. In the background, a year calendar 511 continues across years. In other words, a part of the calendar 511 is displayed on the year calendar view screen 510. In each month box of the calendar 511, a thumbnail image 514 corresponding to a content file produced in the month is displayed. In viewing the thumbnail image 514, one representative thumbnail image may be displayed in each month, or each month may be divided into days and one representative thumbnail image may be displayed in each day as shown in FIG. 3.

FIG. 2B illustrates an example of a calendar view in which content files are presented, for a case where one month is selected as the time range. In the background, a month calendar 521 continues across months. Thus, as with the year calendar 510, a part of the calendar 521 is displayed on a month calendar view screen 520. In each day box of the calendar 521, a thumbnail image 524 corresponding to a content file produced on the day of the day box is displayed. In viewing the thumbnail image 524, one representative thumbnail image may be displayed in each day box, or a plurality of thumbnail images may be displayed in the form of an array in each day box.

FIG. 2C illustrates an example of a calendar view in which content files are presented, for a case where one day is selected as the time range. In the background, a day calendar 531 continues across days. Thus, as with the year calendar view 510 and the month calendar view 520, a part of the calendar 531 is displayed in the day calendar view 530. Each day box of the calendar 531 is divided into a plurality of hour boxes each having a length of one hour, and thumbnail image 534 corresponding to a content file produced in a time range corresponding to a hour box is displayed in that hour box. In addition to the thumbnail image 534, numeral information indicating the production time may also be displayed. In a case where there are two or more pieces of thumbnail data in the same hour box, all pieces of thumbnail data are displayed in the hour box in the order of production time. Although in the present example, the time range is divided into a plurality of parts each having a length of one hour, the length of each part may be set arbitrarily.

The view screens 510, 520, and 530 shown in FIGS. 2A to 2C are configured to be scrolled along a time axis. In each screen, if a scroll bar (not shown) on the calendar view is moved upward, the displayed calendar moves in a reverse direction in time. On the other hand, if the scroll bar on the calendar view is moved downward, the displayed calendar moves in a forward direction in time. Regardless of the time range, the calendar view can be scrolled in a similar manner.

In the present embodiment, as described above, the time range of the calendar view in which content files are displayed can be switched among one year, one month, and one day. FIGS. 4A and 4B are transition diagrams indicating a manner in which the view form is switched. Referring to these figures, the transition among the calendar views is explained. In the following explanation, by way of example, it is assumed that a mouse having at least two buttons (a left button and a right button) is used as the operation accepting unit 170.

In the example of the calendar view shown in FIG. 4A, the calendar view form is switched on a single screen (a window screen) among a plurality of forms including a year calendar view 510, a month calendar view 520, a day calendar view 530, and a content display screen 540. In the year calendar view 510, if a cursor is placed on a particular month box and a mouse is left-clicked, the clicked month is displayed in the month calendar view 520. In the month calendar view 520, if a cursor is placed on a particular day box and the mouse is left-clicked, the clicked day is displayed in the day calendar view 530. That is, each time the mouse is left-clicked, the time range in the calendar view is decreased.

When left-clicking is performed and the calendar view is switched into another calendar view having a new different time range, the controller 180 updates the view status data storage unit 190 so as to store data indicating the new time range and the current point. When the scroll bar (not shown) on any calendar view is operated to change the current point, the controller 180 updates the view status data storage unit 190 so as to store data indicating the new point.

When the day calendar view 530 is displayed, if the mouse is right-clicked, a calendar of a month to which the current date belongs is displayed in the month calendar view 520. In this month calendar view 520, if right-clicking is further performed, a calendar of a year to which the current month belongs is displayed in the year calendar view 510. That is, each time right-clicking is performed, the time range in the calendar view is increased.

To switch the calendar so as to have a different time range in response to right-clicking, the controller 180 reads the view status data from the view status data storage unit 190 and controls the image drawing unit 150 to draw a new calendar view in accordance with the view status data. The controller 180 then updates the view status data storage unit 190 so as to store view status data indicating the time range of the new calendar view.

In the day calendar view 530, if the mouse is left-clicked in a state in which the cursor is placed on a particular thumbnail image 534, a content file corresponding to the clicked thumbnail image 534 is displayed on a content display screen 540. On this content display screen 540, if right-clicking is performed, calendar of a day corresponding to the production date of the content file is displayed in the form of the day calendar view 530.

FIG. 4B illustrates an example of a manner in which the view form is switched among a plurality of forms such that a content display screen is opened as a separate window screen. The switching between forms in a direction from the year calendar view 510 to the day calendar view 530 and in an opposite direction from the day calendar view 530 to the year calendar view 510 is performed in a similar manner as described above with reference to FIG. 4A.

In FIG. 4B, when a particular thumbnail image 534 on the day calendar view 530 is selected, for example, by clicking the left button on the mouse in a state in which the cursor is placed on the thumbnail image 534, a separate window screen serving as a content display screen 540 is displayed and a content file corresponding to the clicked thumbnail image 534 is displayed on the content display screen 540 while maintaining the day calendar view 530 in the current state.

Referring again to FIG. 3, a specific example of the year calendar view 510 is described below. In this example shown in FIG. 3, the year calendar view 510 has an area 512 in which a calendar is displayed in the form of a tree, and also has a list-of-images view area 513 in which a list of images is displayed in the form of a year calendar view.

In the area 512 on the left-hand side of the screen, a numeral indicating the number of content files is displayed for each of all years. For a particular selected year, a numeral indicating the number of content files is also displayed for each month of the selected year. If a particular year is selected in this area 512, a one-year calendar of the selected year is displayed in a display area 513 on the right-hand side of the screen. In the example shown in FIG. 3, the one-year calendar has month boxes assigned to respective months from January to December. Each month box has day boxes arranged in the form of an array having seven columns assigned to respective days of the week. In each day box, a thumbnail image 514 representative of a content file produced on the day of the day box is displayed.

A scroll bar 516 is displayed on the right end of the list-of-images view area 513 in the calendar view. The scroll bar 516 extends in a direction (a vertical direction on the page of FIG. 3) along the time axis. The calendar has not only data of a particular one year but also data of a plurality of years. If a button on the scroll bar 516 is moved up or down, the calendar is changed seamlessly into an adjacent year, thereby allowing a user to seek for a content file of a desired day of a desired month in a desired year.

A year indication bar 515 is disposed in a vertical area left to the scroll bar 516. The year indication bar 515 is used to display the year of the currently displayed calendar, which can be changed seamlessly from one year to another. In the example shown in FIG. 3, the year of the calendar currently displayed in the list-of-images view area 513 is displayed in the middle of the year indication bar 515. In an upper area and a lower area of the year indication bar 515, previous and next years are displayed.

Depending on the mode of the list-of-images view area 513 in the calendar view format, there is a possibility that a calendar displayed on the same screen includes a plurality of years, some of which may be partially displayed. In such a case, the primary year occupying a majority view area may be indicated in the middle of the year indication bar 515. The years other than the primary year may be disabled and these years may be displayed, for example, in a gray-shaded fashion to indicate that these years are disabled.

Figure 5:
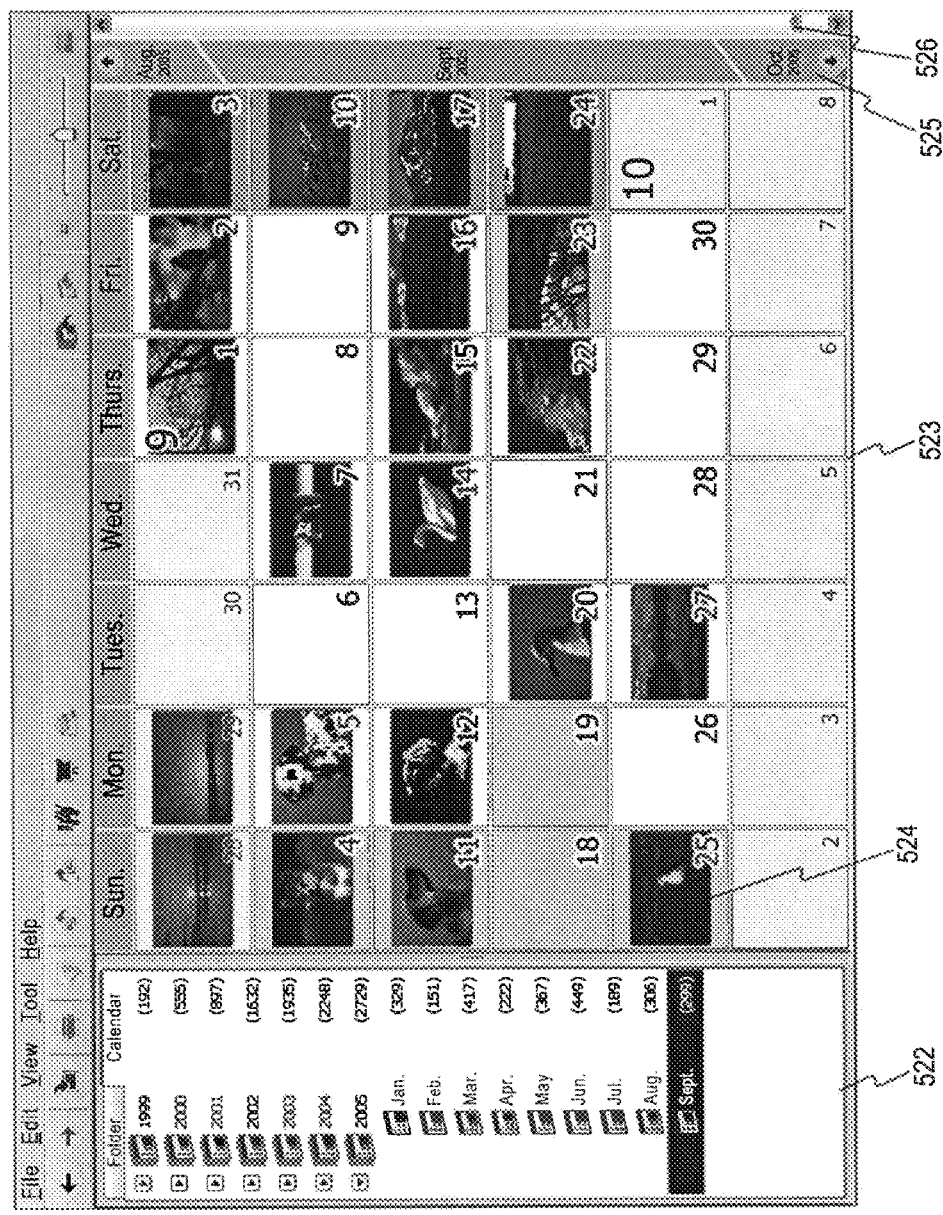
FIG. 5 is a diagram illustrating an example of a manner in which content files of a particular month are displayed in the form of a month calendar view.

FIG. 5 illustrates an example of a month calendar view 520 in which content files of a particular month are displayed (for example, in a similar manner to the calendar view shown in FIG. 2B). In the example shown in FIG. 5, the month calendar view 520 has an area 522 in which a calendar is displayed in the form of a tree, and also has a list-of-images view area 523 in which a list of images is displayed in the form of a month calendar view.

In the area 522, a numeral indicating the number of content files is displayed for each of all years. For a particular year, a numeral indicating the number of content files is also displayed for each month of the year. If a particular month is selected in this area 522, a one-month calendar of the selected month is displayed in a list-of-images view area 523. In the example shown in FIG. 5, a calendar of September is displayed. This calendar has day boxes which are assigned to respective days from the 1st day to the 30th day of September and which are arranged in the form of an array having seven columns assigned to respective days of the week, that is, Sunday to Saturday. In each day box, a thumbnail image 524 representative of a content file produced on the day of the day box is displayed.

A scroll bar 526 is displayed on the right end of the list-of-images view area 523 in the calendar view. The scroll bar 526 extends in a direction (a vertical direction on the page of FIG. 5) along the time axis. The calendar has not only data of a particular one month but also data of a plurality of months. If a button on the scroll bar 526 is moved up or down, the calendar is changed seamlessly into an adjacent month, thereby allowing a user to seek for a content file of a desired day of a desired month.

A month indication bar 525 is disposed left to the scroll bar 526. The month indication bar 525 is used to display the month of the currently displayed calendar, which can be changed seamlessly from one month to another. In the example shown in FIG. 5, the month of the calendar currently displayed in the list-of-images view area 523 is displayed in the middle of the month indication bar 525. In an upper area and a lower area of the month indication bar 525, previous and next months are displayed.

The month view calendar may include days of adjacent months. In such a case, the primary month occupying a majority view area is indicated in the middle of the month indication bar 525. The days of months other than the primary month may be disabled and these days may be displayed, for example, in a gray-shaded fashion to indicate that these days are disabled.

Figure 6:
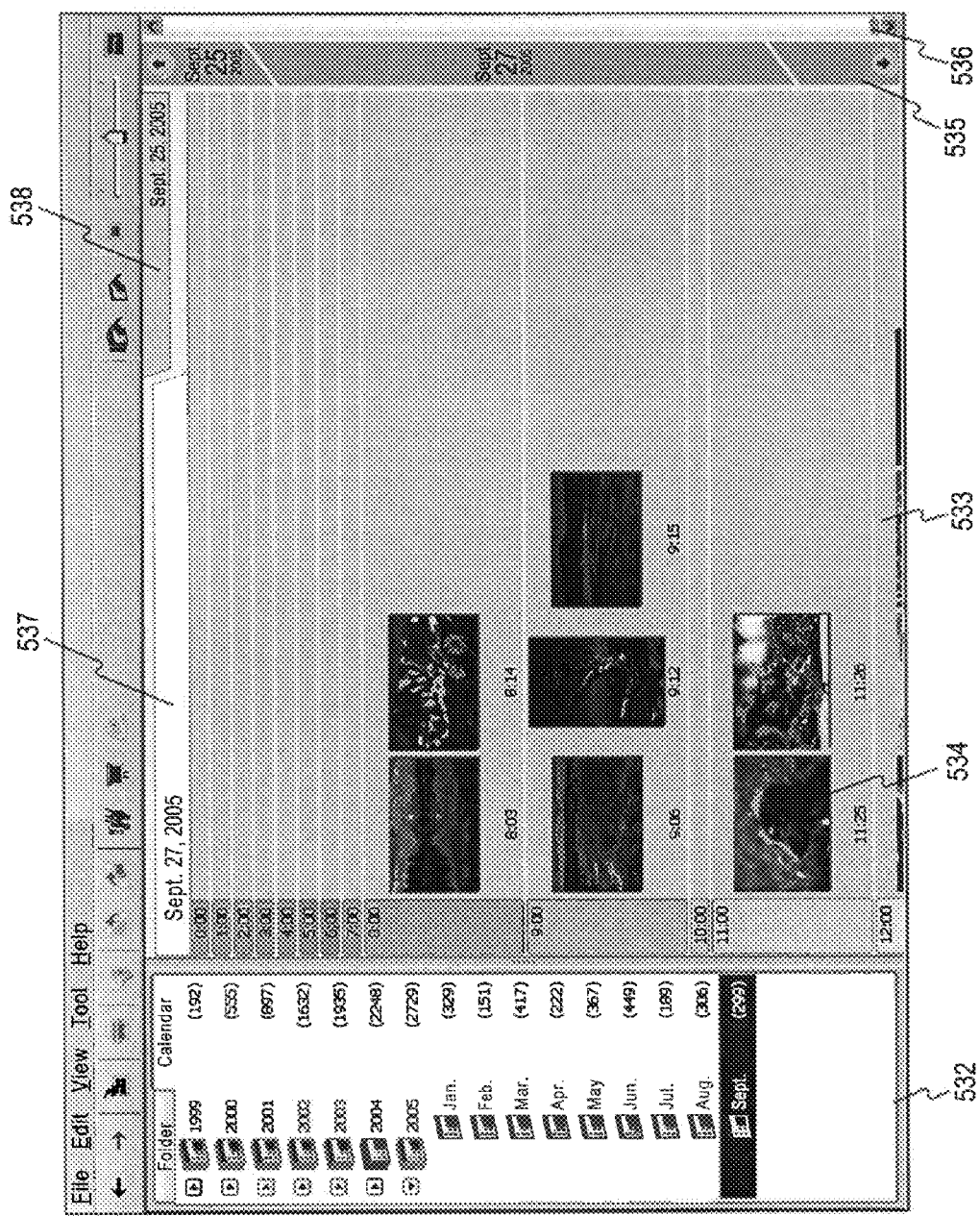
FIG. 6 is a diagram illustrating an example of a manner in which content files of a particular day are displayed in the form of a day calendar view.

FIG. 6 illustrates an example of a day calendar view 530 in which content files of a particular day are displayed (for example, in a similar manner to the calendar view shown in FIG. 2C). In this example shown in FIG. 6, the day calendar view 530 has an area 532 in which a calendar is displayed in the form of a tree, and also has a list-of-images view area 533 in which a list of images is displayed in the form of a day calendar view.

In the area 532, a numeral indicating the number of content files is displayed for each of all years. For a particular selected year, a numeral indicating the number of content files is also displayed for each month of the selected year. A numeral indicating the number of content files for each day of the selected month may also be displayed.

In this calendar view, the list-of-images view area 533 has hour boxes which horizontally extend and each of which is assigned to one hour of the day. A thumbnail image 534 representative of a content file is displayed in a hour box corresponding to the production time of the content file. In the example shown in FIG. 6, a production time is displayed below each thumbnail image 534.

A scroll bar 536 is displayed on the right end of the list-of-images view area 533 in the calendar view. The scroll bar 536 extends in a direction (a vertical direction on the page of FIG. 3) along the time axis. The calendar has not only data of a particular one day but also data of a plurality of days. If a button on the scroll bar 536 is moved up or down, the calendar is changed seamlessly into an adjacent day, thereby allowing a user to seek for a content file of a desired day.

There is a possibility that many days have no content files. In such a case, if many days having no content files are simply displayed in the day calendar view 530, a user has to scroll the view for a long time until a day including a content file appears. In the example shown in FIG. 6, to avoid the above problem, days having no content files are removed from the list-of-images view area 533 in the calendar view.

When a particular day is selected (for example, by clicking the left button of the mouse) in the month calendar view 520 (FIG. 5), there is a possibility that the selected day includes no content file. In such a case, not the selected day but a closest day having a content file may be displayed in the day calendar view 530. A closest day having a content file may be selected from those located in an upper range of the time axis, that is, from those which are newer in time.

In a case where successive days have a content file, it is likely that an event (such as a travel) occurred over those successive days. Thus, in such a case, it is desirable to treat those successive days as a group. A label 537 indicating a start day is put on the first day of the group and a label 538 indicating a last day is put on the last day of the group. The labels 537 and 538 may be colored as required. For example, a label for Saturday may be colored in blue, a label for Sunday may be colored in red, etc.

A day indication bar 535 is displayed in a vertical area left to the scroll bar 536. The day calendar continues to adjacent days. Thus, the day indication bar 535 is used to indicate the current day of the calendar. In the example shown in FIG. 6, the day of the list-of-images view area 533 in the form of a calendar view is indicated in the middle of the day indication bar 535. A previous day is indicated in the upper area of the day indication bar 535, while a next day is indicated in the lower area. Note that a day having no content file is not employed as the next or previous day.

In a case where a plurality of days are displayed on the same screen, the primary day occupying a majority view area may be indicated in the middle of the day indication bar 535. Days other than the primary day (i.e., days which are currently not of interest) may be disabled and those days may be displayed, for example, in a gray-shaded fashion to indicate that those days are disabled.

Figure 7:
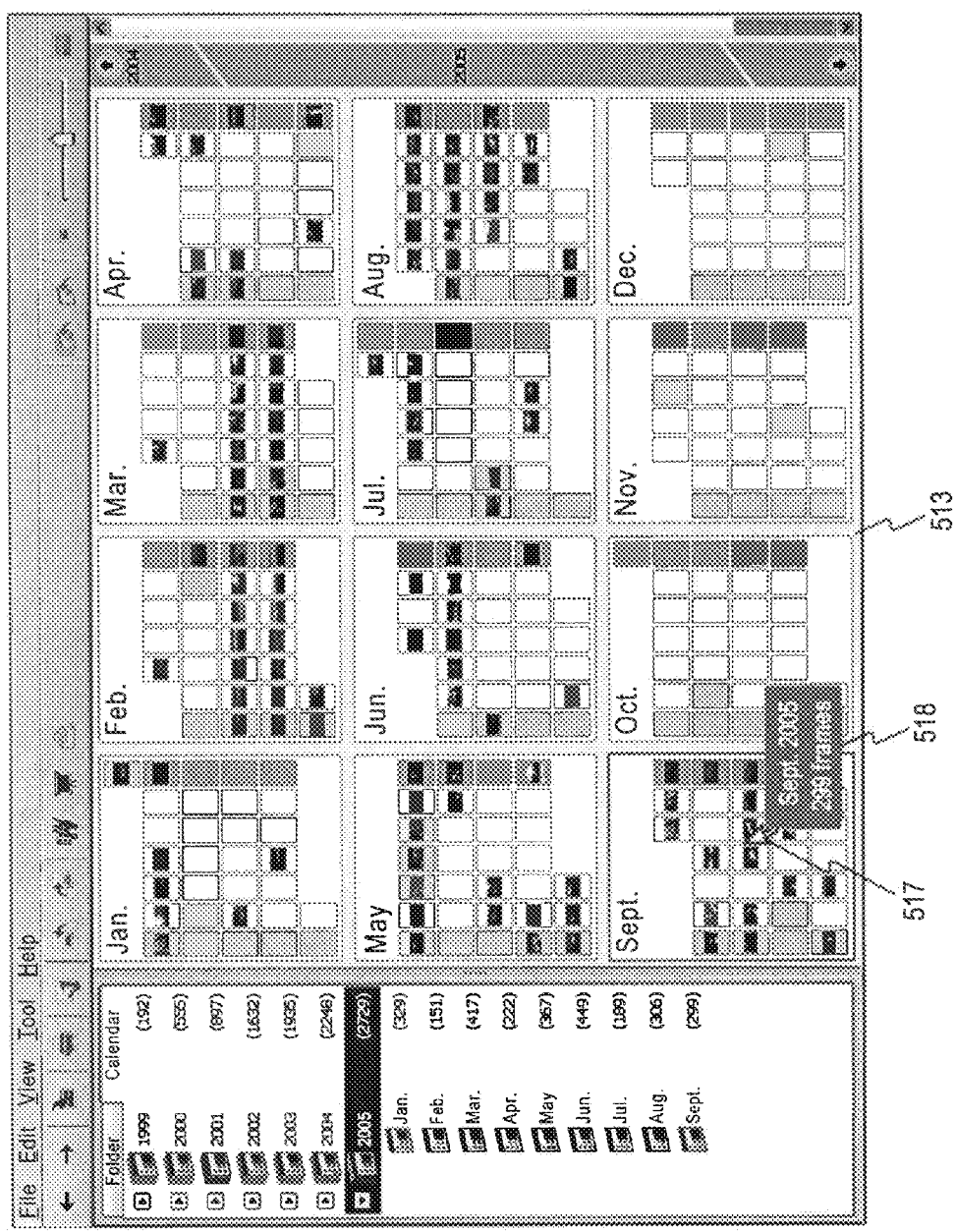
FIG. 7 is a diagram illustrating an example of a manner in which a tooltip is displayed.

FIG. 7 illustrates an example of a manner in which a tooltip is displayed. For example, if the cursor 517 is moved onto a particular month in the list-of-images view area 513 of the year calendar view 510, a numeral indicating the number of content files included in this month is displayed together with the name of the month in a tooltip 518. The tool tip 518 may be displayed for a short time such as several seconds or several ten seconds, or may be continuously displayed until the cursor is moved away.

Figure 8:
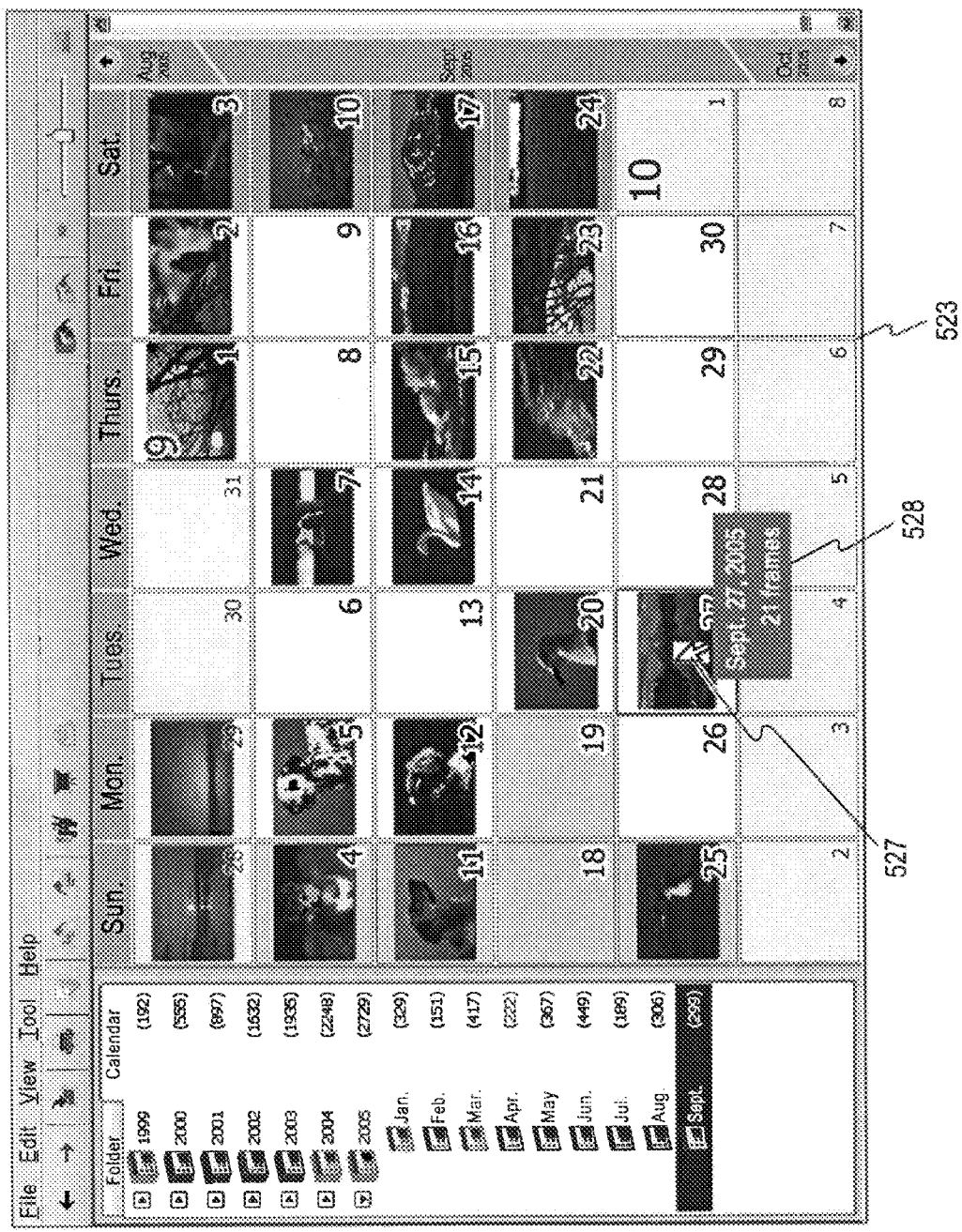
FIG. 8 is a diagram illustrating an example of a manner in which a tooltip is displayed.

FIG. 8 illustrates another example of a manner in which a tooltip is displayed. For example, if the cursor 527 is moved onto a particular day in the list-of-images view area 523 of the month calendar view 520, a numeral indicating the number of content files included in day is displayed together with an indication of the day in a tooltip 528. The period during which the tooltip 528 is displayed may be set in a similar manner to the tool tip 518 described above.

Figure 9:
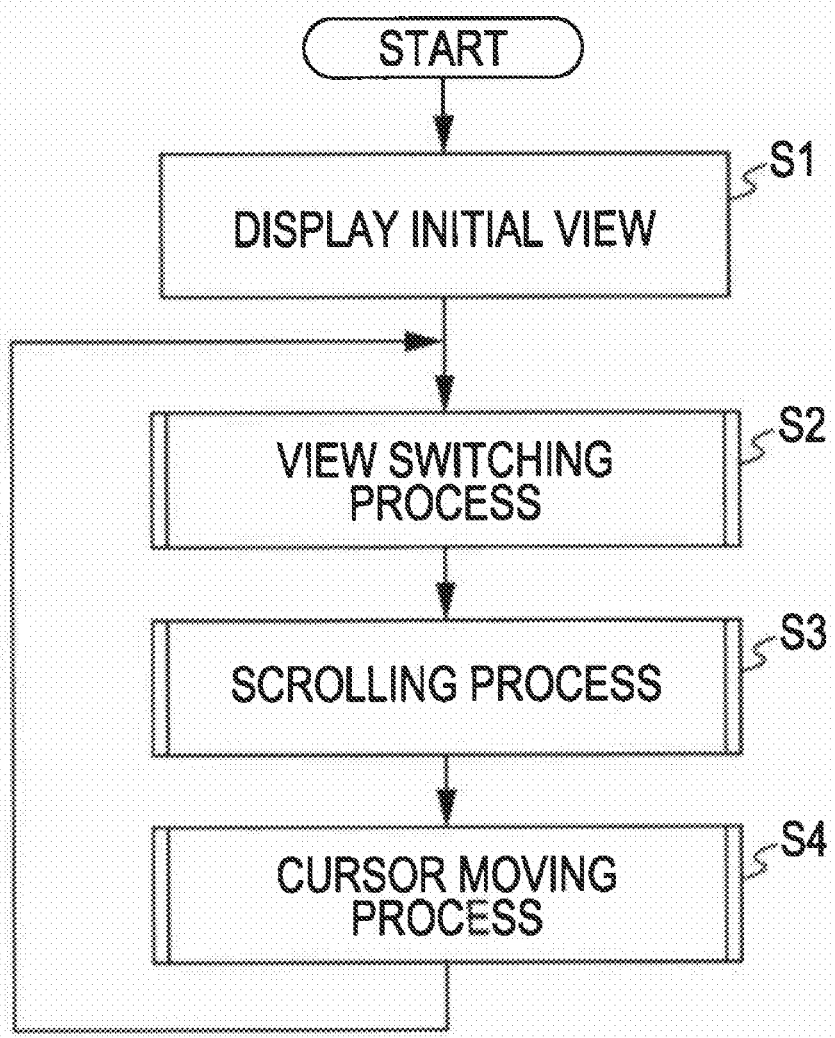
FIG. 9 is a flow chart illustrating a process of providing a content file presentation service in the form of a calendar view.

FIG. 9 is a flow chart illustrating a process, performed by the information presenting apparatus according to the present embodiment, to provide a content file presentation service in the form of a calendar view. In a first step (step S1), a year calendar view 510, a month calendar view 520, or a day calendar view 530 is displayed as an initial view.

If the operation accepting unit 170 accepts an operation performed by a user to issue a command to switch the time range, the controller 180 switches the view form in accordance with the view status data stored in the view status data storage unit 190 (step S2).

On the other hand, in a case where the operation accepting unit 170 accepts a scrolling operation performed by a user, the controller 180 performs a scrolling process (step S3).

In a case where operation accepting unit 170 accepts a cursor moving operation performed by a user, the controller 180 performs a cursor moving process (step S4).

The view form switching process, the scrolling process, and the cursor moving process are performed periodically at predetermined intervals.

Figure 10:
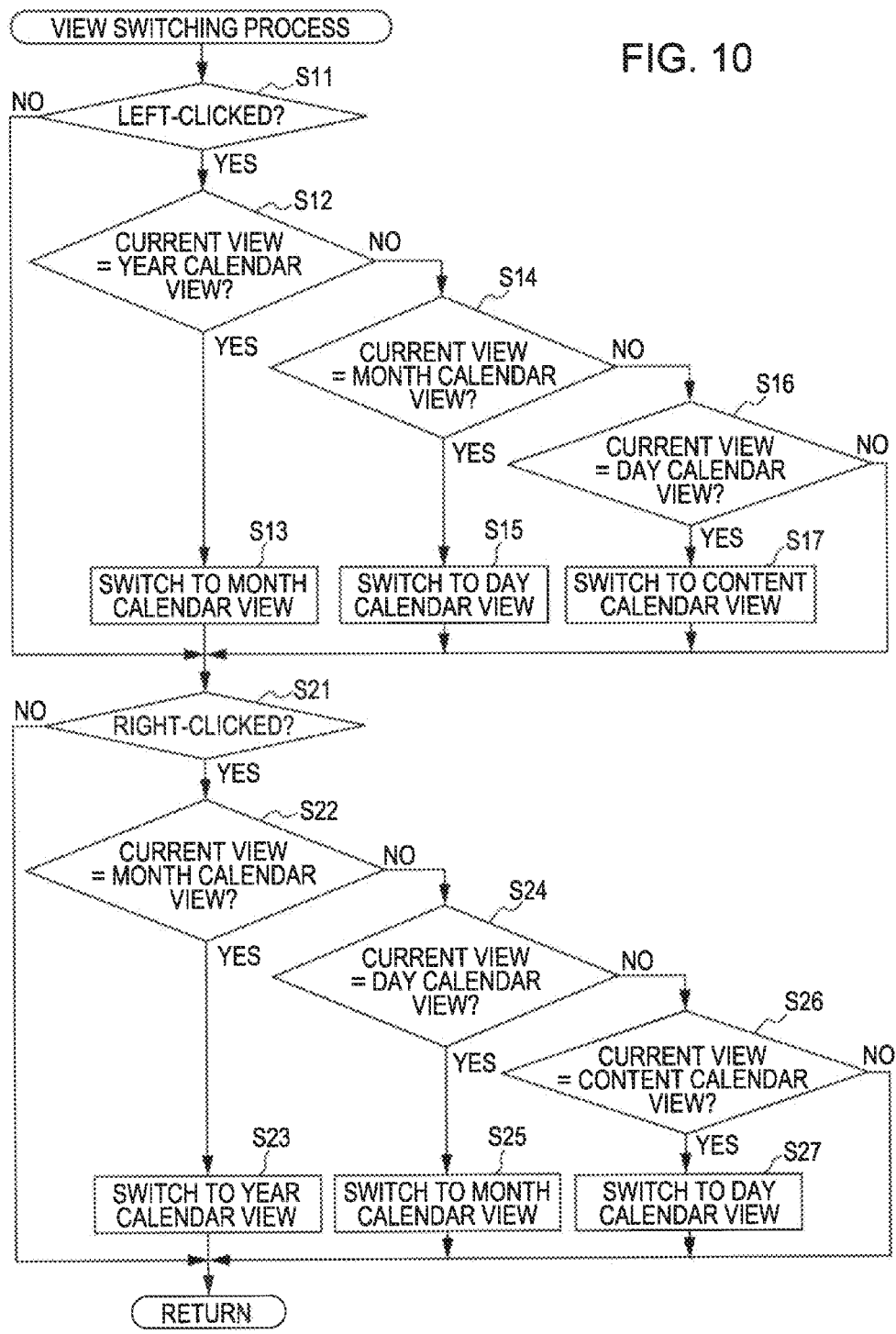
FIG. 10 is a flow chart illustrating details of a view switching process.

FIG. 10 is a flow chart illustrating the details of the view form switching process (step S2).

If the operation accepted by the operation accepting unit 170 is a left-clicking operation (that is, if the answer to step S11 is YES), the controller 180 detects the time range indicated by the view status data stored in the view status data storage unit 190 and determines whether the current view form is the year calendar view 510, the month calendar view 520, or the day calendar view 530 (steps S12, S14, and S16).

If the current display screen is in the form of the year calendar view 510 (that is, if the answer to step S12 is YES), the controller 180 controls the image drawing unit 150 to draw a calendar of the month selected by the left-clicking operation in the form of the month calendar view 520 (step S913). In this process, the controller 180 acquires, via the acquisition unit 140, necessary calendar information and thumbnail data from the calendar information storage unit 130 and the thumbnail data manager 120. The controller 180 then updates the view status data storage unit 190 such that the displaying-status data indicates that one month is selected as the unit of the time range.

If the current display screen is in the form of the month calendar view 520 (that is, if the answer to step S14 is YES), the controller 180 controls the image drawing unit 150 to draw a calendar of the day selected by the left-clicking operation in the form of the day calendar view 530 (step S15). In this process, the controller 180 acquires, via the acquisition unit 140, necessary calendar information and thumbnail data from the calendar information storage unit 130 and the thumbnail data manager 120. The controller 180 then updates the view status data storage unit 190 such that the displaying-status data indicates that one day is selected as the unit of the time range.

If the current display screen is in the form of the day calendar view 530 (that is, if the answer to step S16 is YES), the controller 180 controls the image drawing unit 150 to draw the content display screen 540 and display a content file therein corresponding to the thumbnail image selected by the left-clicking operation (step S17). In this process, the controller 180 acquires, via the acquisition unit 140, the necessary content file from the content file storage unit 110.

If the operation accepted by the operation accepting unit 170 is a right-clicking operation (that is, if the answer to step S21 is YES), the controller 180 detects the time range indicated by the view status data stored in the view status data storage unit 190 and determines whether the current display screen is in the form of the year calendar view 510, the month calendar view 520, or the day calendar view 530 (steps S22, S24, and S26).

If the current display screen is in the form of the month calendar view 520 (that is, if the answer to step S22 is YES), the controller 180 controls the image drawing unit 150 to draw a calendar of the year indicated by the displaying-status data stored in the view status data storage unit 190 in the form of the year calendar view 510 (step S23). In this process, the controller 180 acquires, via the acquisition unit 140, necessary calendar information and thumbnail data from the calendar information storage unit 130 and the thumbnail data manager 120. The controller 180 then updates the view status data storage unit 190 such that the displaying-status data indicates that one year is selected as the unit of the time range.

If the current display screen is in the form of the day calendar view 530 (that is, if the answer to step S24 is YES), the controller 180 controls the image drawing unit 150 to draw a calendar of the month indicated by the displaying-status data stored in the view status data storage unit 190 in the form of the month calendar view 520 (step S25). In this process, the controller 180 acquires, via the acquisition unit 140, necessary calendar information and thumbnail data from the calendar information storage unit 130 and the thumbnail data manager 120. The controller 180 then updates the view status data storage unit 190 such that the displaying-status data indicates that one month is selected as the unit of the time range.

In the case where the view form is switched in the manner described above with reference to FIG. 4A, if the current display screen is in the form of the content display screen 540 (that is, if the answer to step S26 is YES), the controller 180 controls the image drawing unit 150 to draw a calendar of the day indicated by the displaying-status data stored in the view status data storage unit 190 in the form of the day calendar view 530 (step S27). In this process, the controller 180 acquires, via the acquisition unit 140, necessary calendar information and thumbnail data from the calendar information storage unit 130 and the thumbnail data manager 120. The controller 180 then updates the view status data storage unit 190 such that the displaying-status data indicates that one day is selected as the unit of the time range.

Figure 11:
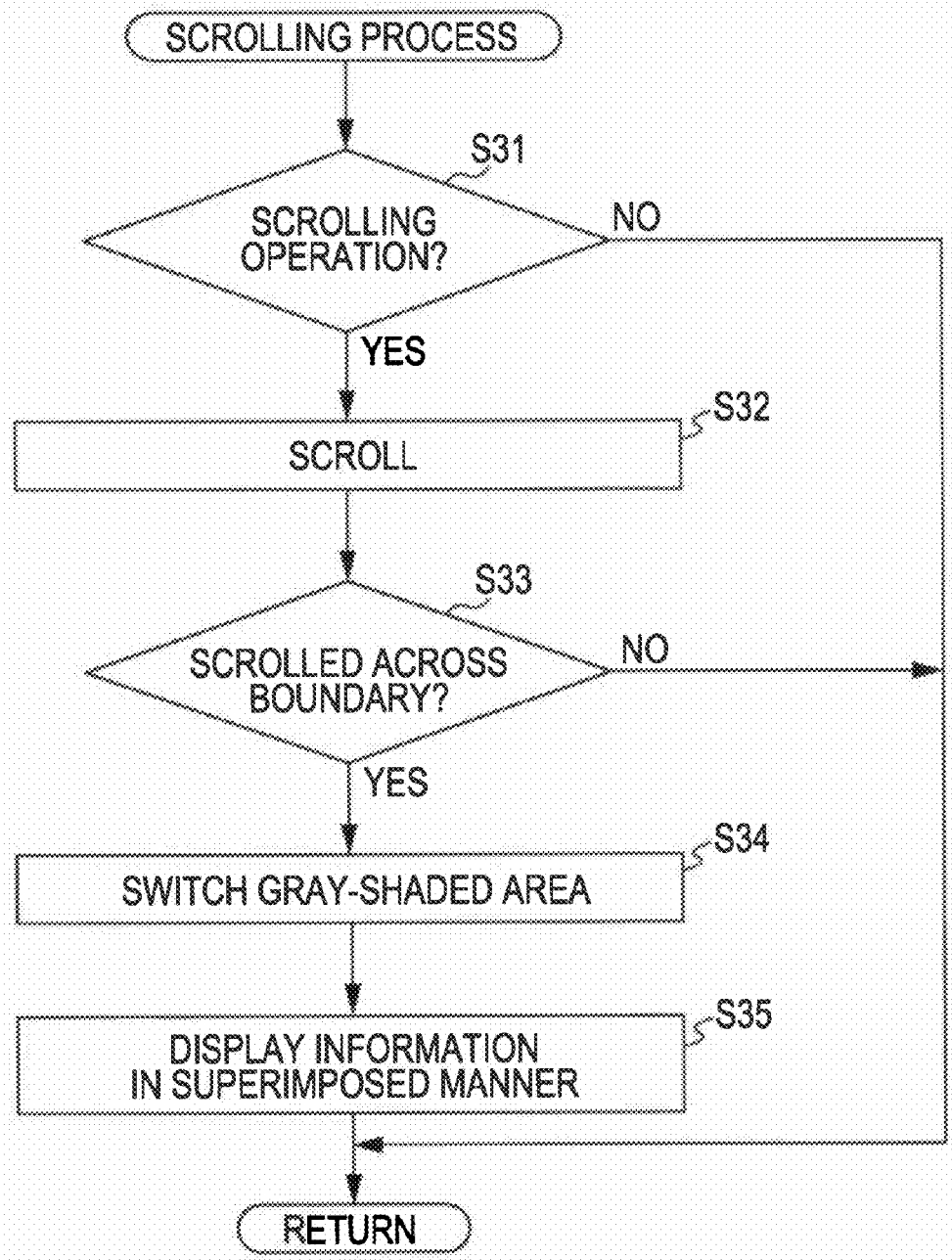
FIG. 11 is a flow chart illustrating details of a scrolling process.

FIG. 11 is a flow chart illustrating the details of the scrolling process (step S2).

If the operation accepted by the operation accepting unit 170 is the scrolling operation (that is, if the answer to step S31 is YES), the controller 180 instructs the image drawing unit 150 to scroll the display screen (step S32). In this process, the controller 180 updates the view status data storage unit 190 so that the view status data indicates the scrolled position.

If the scrolling is performed beyond a boundary of the current time range, (that is, if the answer to step S33 is YES), more specifically, if the scrolling is performed beyond a boundary of the current year of the year calendar view 510, a boundary of the current month of the month calendar view 520, or a boundary of the current day of the day calendar view 530, then the controller 180 controls the image drawing unit 150 to change the calendar view such that areas other than a new primary time range (a particular year, month or day) are disabled and displayed in a gray-shaded manner (step S34).

The controller 180 further controls the image drawing unit 150 to display a tooltip in a superimposed manner (step S35). More specifically, the controller 180 acquires, via the acquisition unit 140, information associated with the new primary time range from the thumbnail data manager 120 and displays the acquired information in the superimposed manner by controlling the image drawing unit 150.

Figure 12:
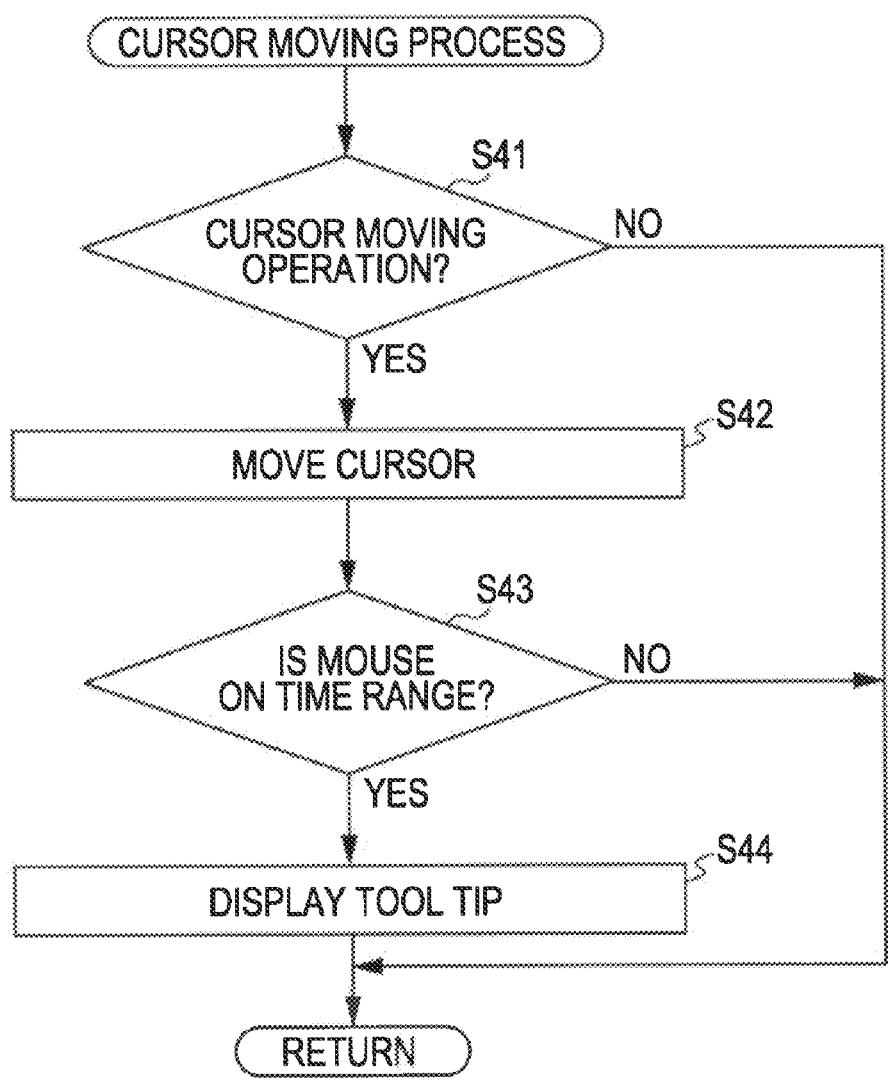
FIG. 12 is a flow chart illustrating details of a cursor moving process.

FIG. 12 is a flow chart illustrating the details of the cursor moving process (step S40).

If the operation accepted by the operation accepting unit 170 is the cursor moving operation (that is, if the answer to step S41 is YES), the controller 180 instructs the image drawing unit 150 to move the cursor (step S42).

In a case where the cursor has moved onto one of time range units on the calendar view (that is, if the answer to step S43 is YES), the controller 180 instructs the image drawing unit 150 to display the information associated with the time range unit in the form of a tooltip (step S44).

As described above, the information presenting apparatus according to the present embodiment is capable of setting the time range of the calendar view to one year, one month, or one day (or one hour), switching the background calendar view into a year calendar view, a month calendar view, or day calendar view depending on the selected time range, and displaying thumbnail images representative of content files at locations corresponding to content production date in the calendar view.

The information presenting apparatus according to the present embodiment provides the user interface that allows a user to seamlessly scroll the list-of-images view screen in the calendar view form across boundaries of years, months, or days by using the operation accepting unit 170 in a similar manner for any time range.

In the information presenting apparatus according to the present embodiment, data indicating the current view status is stored in the view status data storage unit 190. When a command to change the time range is issued via the operation accepting unit 170, the information presenting apparatus determines the new time range and the current position based on the view status data stored in the view status data storage unit 190, and the information presenting apparatus switches the time range while maintaining the current position.

In any of the year calendar view, the month calendar view, or the day calendar view, a user can identify a content file by a content production date via the calendar view in which thumbnail vies are displayed according to the content production date. If the user specifies a thumbnail image via the operation accepting unit 170, the information presenting apparatus determines that a content file corresponding to the specified thumbnail image has been selected by the user.

For still image files, a reduced image of each original still image may be used as thumbnail data. For audio files, a visual effect image at a particular time or the like may be used as thumbnail data. For motion image files, a reduced image of a frame at a particular time may be used as thumbnail data.

In the list-of-images view screen in the calendar view, only one thumbnail image of a starting frame may be displayed for each motion image. However, in this case, it is very difficult for a user to quickly identify each motion image. Besides, because only one thumbnail image is presented regardless of whether a corresponding motion image is short or long, it is difficult for a user to determine the length of each motion image from the thumbnail image displayed in the calendar view, although it is easy to get information about the date/time when each motion image was shot. Furthermore, viewing only one thumbnail image of the start frame does not provide any clue or key based on which to seek for a particular scene in the motion image, and thus it takes a long time for a user to understand the content of the motion image file by performing seeking over the entire motion image file.

In the present embodiment, to avoid the above problems, representative frames are extracted from a plurality of points of a motion image, and a thumbnail image is produced from each extracted representative frame. The resultant produced thumbnail images are managed as a set of thumbnail image of the motion image such that each thumbnail image is related to its playback position. Thumbnail images belonging to a particular set are expanded along the time axis on the list-of-images view screen in the calendar view so that a user can easily understand the content of the motion image. If the user selects one of the thumbnail images displayed in the expanded manner, the motion image is played back starting from the playback position corresponding to the selected thumbnail image. This makes it possible for the user to easily seek the motion image. Thus, the user interface provided in this manner allows the user to easily manage content files.

Figure 13:
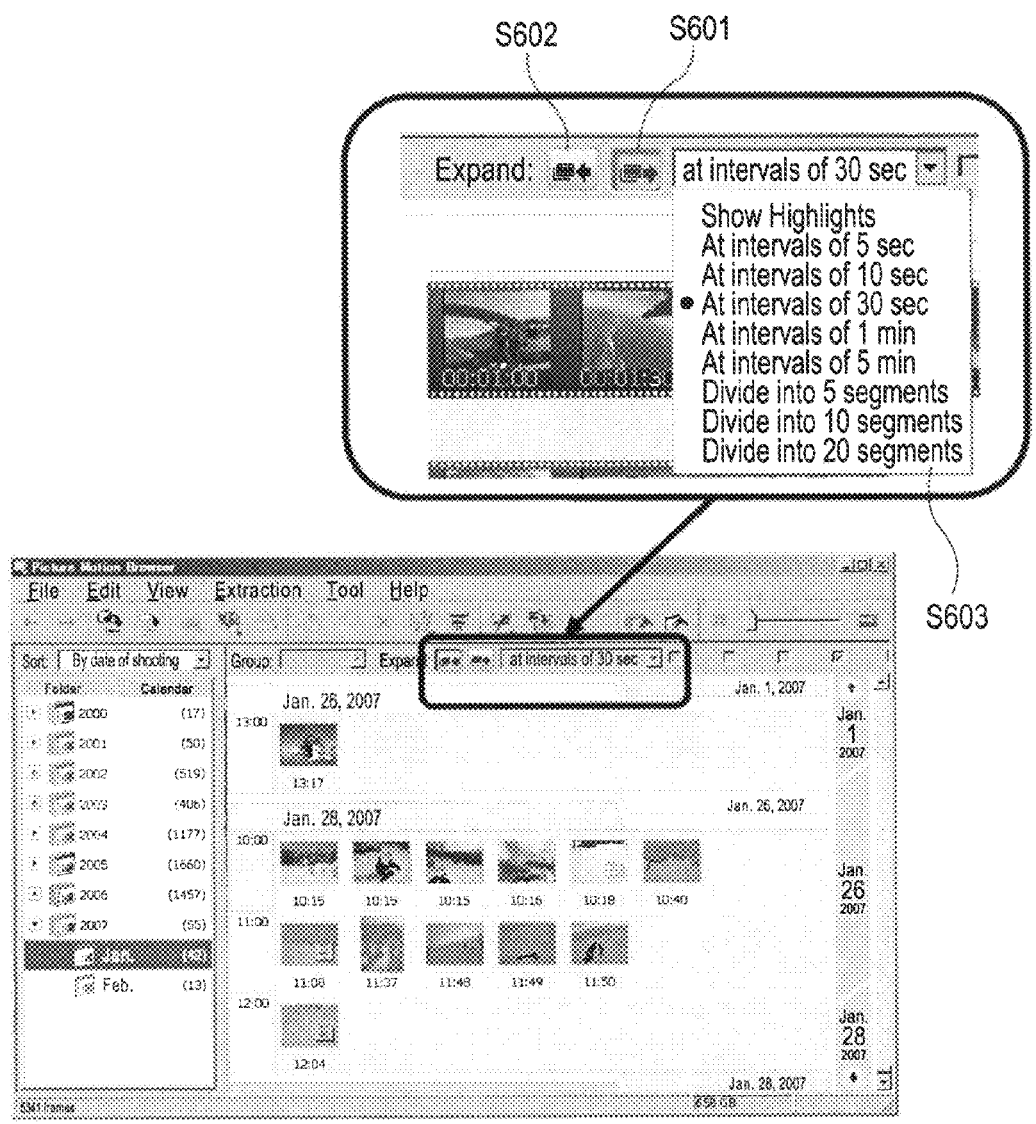
FIG. 13 is a diagram illustrating an example of a list-of-images view screen having an Expansion button and a Collapse button.

As shown in FIG. 13, the user interface provided in the form of the day calendar view (and also the year calendar view or the month calendar view) has an Expand button 601 and a Collapse button 602. If the Expand button 601 is pressed, a single thumbnail image (for example, corresponding to a start frame) being current displayed is expanded into a plurality of thumbnail images extracted from a corresponding motion image. If the Collapse button 602 is pressed, a plurality of thumbnail images displayed in the expanded fashion are collapsed into a single thumbnail image. A user is allowed to operate these buttons via the operation accepting unit 170.

In the expansion mode, a thumbnail image corresponding to each motion image is expanded into the form of a film roll in which thumbnail images are placed along the time axis. If one of the thumbnail images on the film roll is selected, for example, by clicking the left button on the mouse, then playback of the motion image is started from the point corresponding to the selected thumbnail image. In the playback operation, a playback window screen is newly opened separately from the content file presenting window, and the motion image is displayed in the playback window screen.

During the playback operation of the motion image on the playback window screen, a film roll is displayed in a bottom area of the playback window screen and thumbnail images of the motion image being currently played back are displayed in the order of time along the film roll. The displaying of the thumbnail images on the film roll proceeds in synchronization with the change in playback point of the motion image. If one of the thumbnail images on the film roll is selected, for example, by clicking the left button on the mouse, the playback point jumps to a point corresponding to the selected thumbnail image. This makes it possible to perform seeking during the playback operation.

In the example shown in FIG. 13, the Expand button 601 and the Collapse button 602 are disposed in an upper area of the list-of-images view area 533 of the calendar view.

Figure 14:
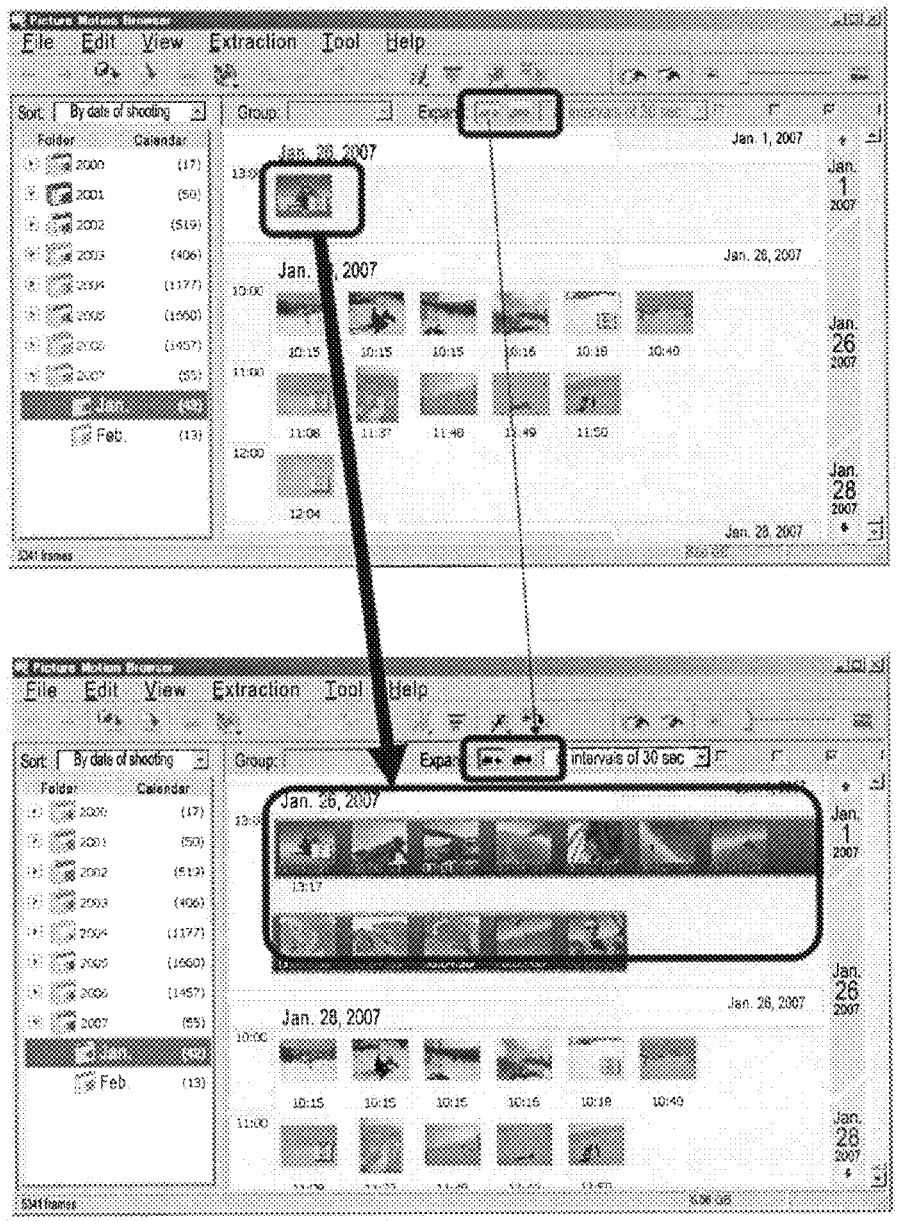
FIG. 14 is a diagram illustrating a manner in which a list-of-images view screen is switched between an expansion-off mode and an expansion-on mode.

FIG. 14 illustrates a manner in which the list-of-images view screen is switched between an expansion-off mode and an expansion-on mode. When the list-of-images view screen is in the expansion-off mode as shown on the top of FIG. 14, if one of thumbnail images is selected in the list-of-images view area and then the Expand button 601 is pressed, the list-of-images view screen is switched into the expansion-on mode as shown on the bottom of FIG. 14, and thumbnail images of the selected motion image are expanded along the film roll. In this state, if the Collapse button 602 is pressed, the thumbnail images expanded along the film roll are collapsed into a single thumbnail image.

Each film roll corresponding to each motion image is formed in the shape of a black film so that a user can easily distinguish from other film rolls from their visual differences. A numeral indicating the time (offset time) as measured from the start of the motion image is displayed below each thumbnail image on the film roll.

Figure 15:
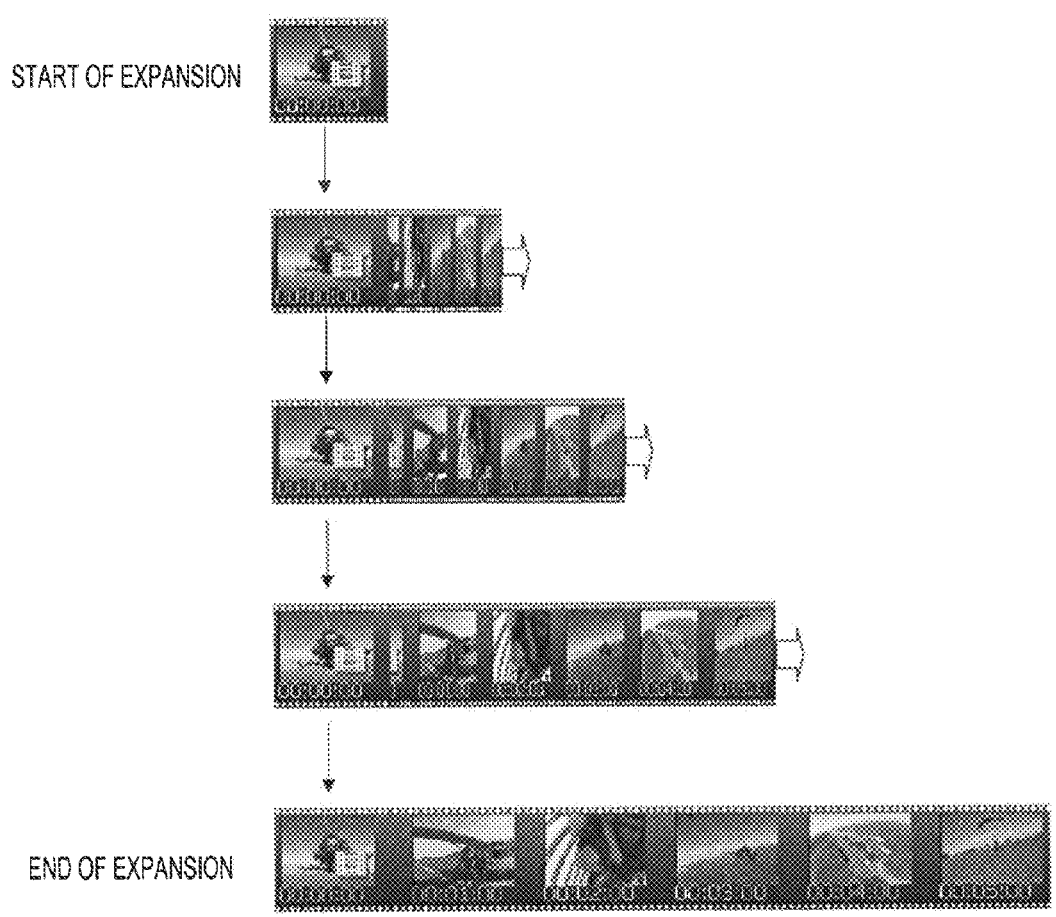
FIG. 15 is a diagram illustrating a manner in which a process of expanding a representative thumbnail of a motion image into a plurality of thumbnail images is displayed as the process proceeds such that a user can easily recognize the status of the expansion process.

When the expansion mode is switched from the off state into the on state and the expansion of thumbnail images of a motion image is started, the process of expanding the thumbnail images on the film roll is displayed in the form of an animation so that a user can easily understand the progress of the process. FIG. 15 illustrates an example of an animation in which the film roll expands from the first thumbnail image. Depending on the size of the list-of-images view screen, the film roll may be continued to another roll or a scroll bar may be disposed on the bottom edge of the film roll. In a case where the expansion mode switched from the on state into the off state by pressing the Collapse button, the opposite process is displayed in an animation.

Referring again to FIG. 13, a selection UI (User Interface) 603 is disposed adjacent to (right to, in the example shown in FIG. 13) the Expand button 601. The selection UI 603 is a user interface that allows a user to select one of methods of extracting representative image frames from a plurality of points of a specified motion image in the thumbnail expansion process. In the example shown in FIG. 13, the selection UI 603 is in the form of a pull-down menu.

When the expansion mode is in the on state, thumbnail images are expanded along a film roll and the selection UI 603 is enabled, that is, the pull-down menu is enabled. If the expansion mode is turned off, a plurality of thumbnail images expanded along a film roll are collapsed into a single thumbnail image, and the selection UI 603 is disabled and thus the pull-down menu is disabled.

Examples of the methods of extracting representative image frames from a plurality of points of a motion image include extracting frames at predetermined time intervals (for example, at intervals specified by a user), extracting frames at boundaries of a particular number (5, 10, etc.) of equal-length segments of a motion image, etc. A user is allowed to select one of such methods from the selection UI 603 in the form of the pull-down menu.

Another example of the method of extracting image frames is to extract highlight scenes such as a scene including a face of an important person, a frame at which a scene change occurs, a frame at which zooming occurs, etc., detected according to an evaluation function of video data and/or audio data. Some examples of methods of extracting highlight images from a motion image may be found, for example, in Japanese Patent Application No. 2006-60592 or Japanese Patent Application No. 2006-115242 both assigned to the applicant of the present invention.

Figure 16:
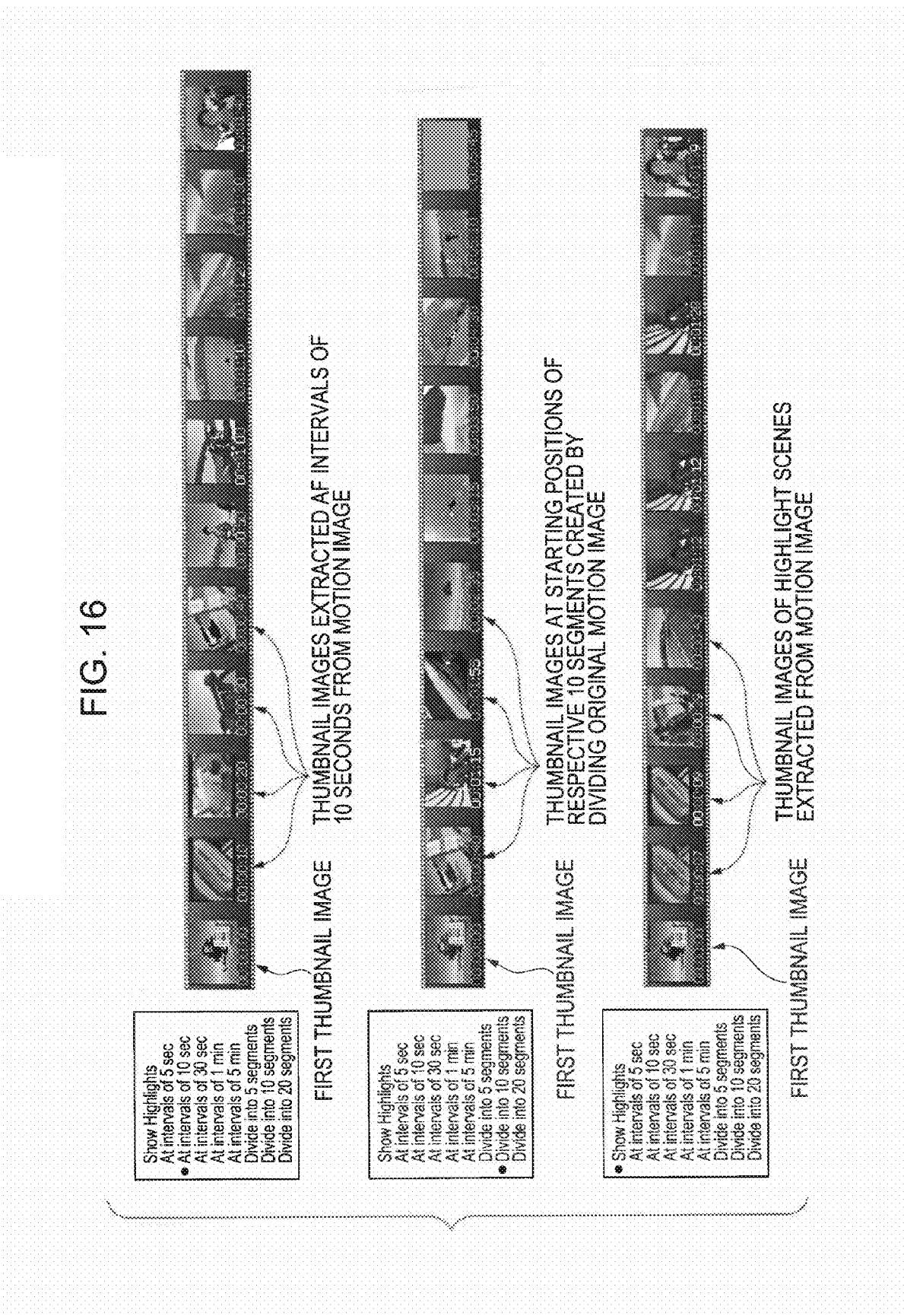
FIG. 16 is a diagram illustrating a manner in which a mode of displaying a set of thumbnail images extracted from a motion image is switched depending on a thumbnail extraction mode selected from a pull-down selection menu.

FIG. 16 illustrates a manner in which the mode of displaying thumbnail images along a film roll is switched in accordance with a frame extraction method selected from the pull-down menu of the selection UI 603. For example, if "At intervals of 10 sec" is selected from the menu, frames are extracted at intervals of 10 seconds from a motion image, thumbnail images are produced from the extracted frames, and the resultant thumbnail images are displayed in the order of time along a film roll. In a case where "Divide into 10 segments" is selected, a specified motion images is divided into 10 segments with an equal length, frames are extracted at boundaries of these 10 segments, thumbnail images are produced from the extracted frames, and the resultant thumbnail images are displayed in the order of time along a film roll. In a case where "Show Highlights" is selected, highlight frames are extracted from a specified motion image, thumbnail images are produced from the extracted frames, and the resultant thumbnail images are displayed in the order of time along a film roll.

If a user selects one of thumbnail images on a film roll, for example, by clicking the left button on the mouse, then playback of the motion image is started from the point corresponding to the selected thumbnail image. In the playback operation, a playback window screen is newly opened separately from the content file presenting window, and the motion image is displayed in the playback window screen.

Figure 17:
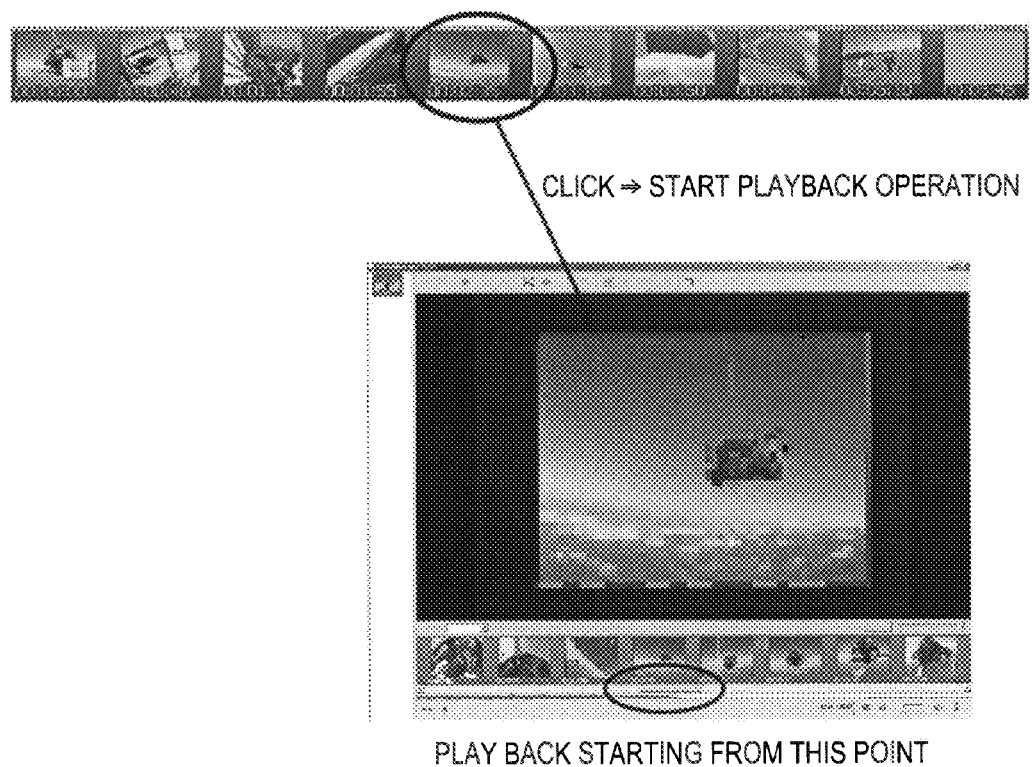
FIG. 17 is a diagram illustrating a manner in which a motion image is played back starting from a point corresponding to a thumbnail image clicked on a film roll.

FIG. 17 illustrates a manner in which a motion image is played back starting from a point corresponding to a clicked thumbnail image on a film roll. As shown in FIG. 17, a film roll is displayed in a bottom area of the playback window screen and thumbnail images of the motion image being currently played back are displayed in the order of time along the film roll. The displaying of the thumbnail images on the film roll proceeds in synchronization with the change in playback point of the motion image. If one of the thumbnail images on the film roll is selected, for example, by clicking the left button on the mouse, the playback point jumps to a point corresponding to the selected thumbnail image. This makes it possible to perform seeking during the playback operation.

Figure 18:
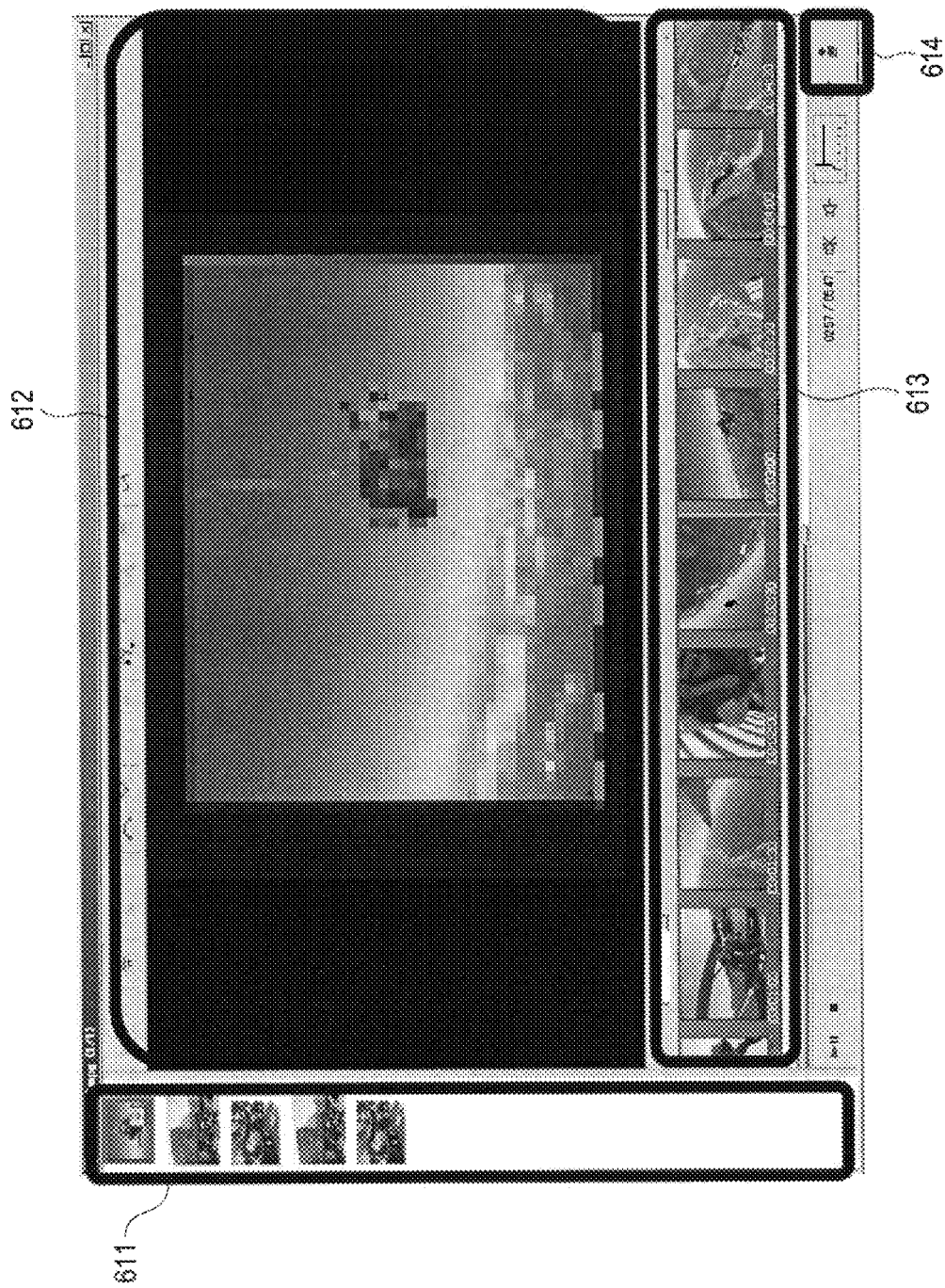
FIG. 18 is a diagram illustrating an example of a form of a screen for playing back a motion image.

FIG. 18 illustrates an example of a form of a screen for playing back a motion image. In the example shown in FIG. 18, the motion image playback window has a list-of-images view area 611 disposed on the left-hand side of the playback window, an image (still/motion image) playback area 612 disposed in an upper right area of the playback window, and a film roll display area 613 disposed in a lower area of the window. In the list-of-images view area 611, a list of thumbnail images of content files stored in a folder, or a list of thumbnail images of motion images whose production date is the same as that of a motion image being currently played back is displayed. A user is allowed to switch the mode in which the film roll display area 613 is displayed or not displayed by operating a film roll display on/off button 614.

As described above, in the information presenting apparatus according to the present embodiment, a plurality of thumbnail images of a motion image are expanded in the order of time along a film roll on the list-of-images view screen in the form of the calendar view, thereby providing a great improvement in ease of finding/identifying desired images. That is, a user can easily understand the content and the length of each motion image without having to play back the motion image, and it is possible to play back a specified motion image starting from a specified point. Thus, it becomes easy to seek for an arbitrary motion image.

The process of expanding thumbnail images of a motion image along a film roll is described in further detail below.

Figure 19:
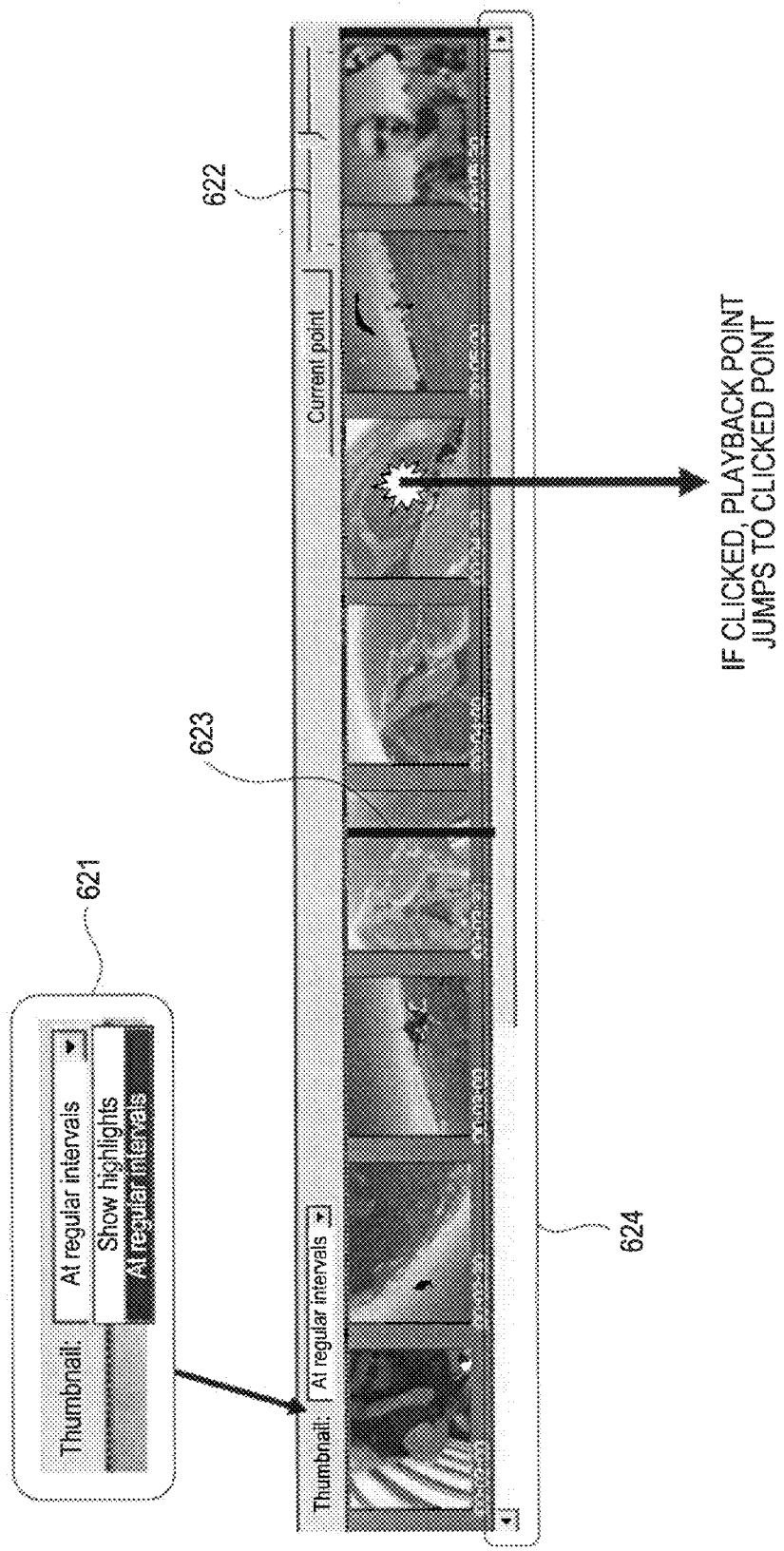
FIG. 19 is a diagram illustrating details of a film roll view area in a mode in which thumbnail images are extracted at regular intervals.

As described above, when the film roll display mode is enabled by pressing the film roll display on/off button 614, a film roll is displayed in the film roll display area 613 on the motion image playback screen. FIG. 19 illustrates details of the film roll display area. In this example shown in FIG. 19, "At intervals of 10 sec" is selected as the method of extracting frames from a motion image in the thumbnail expansion process.

A selection UI 621 in the form of a pull-down menu is disposed in an upper left area of the film roll display area 613. By selecting one of items from this menu, a user is allowed to specify a method of extracting representative image frames from a plurality of points of a motion image. In the example shown in FIG. 19, extracting frames at regular intervals is specified as the method. Thus, in this case, frames are extracted from the motion image at intervals of 10 seconds, thumbnail images are produced from the extracted frames, and the resultant thumbnail images are displayed in the order of time along the film roll. A numeral indicating the time (offset time) as measured from the start of the motion image is displayed below each of the thumbnail images on the film roll.

A slide bar 622 for adjusting the scale or the time intervals at which thumbnails are displayed on the film roll is disposed in an upper right area of the film roll display area 613. By operating a knob on the slide bar 622, a user is allowed to change the thumbnail-to-thumbnail time interval on the film roll into 5 seconds, 10 seconds, 30 seconds, etc.

A current playback point indicator 623 indicating the current playback point is displayed on the film roll. The position of the current playback point indicator 623 moves with the progress of the playback of a motion image (the details of the process will be described later). A user is allowed to perform seeking within the motion image being currently played back by moving the current playback point indicator 623 along the film roll by using the mouse or the like.

Depending on the horizontal length of the film roll display area 613 (or the screen size) or depending on the total number of thumbnail images of a motion image, all expanded thumbnail images are not displayed at a time in the film roll display area 613. In such a case, a slide bar 624 is displayed along a lower edge of the film roll. The scroll bar 624 may be displayed using a known technique. The longitudinal direction, i.e., the horizontal direction of the scroll bar 624 corresponds to the time axis, and the horizontal length of the scroll bar 624 indicates the range of thumbnail images of the motion image being currently played back. By moving the bar, it is possible to adjust the range of displayed thumbnail images.

If one of the thumbnail images on the film roll is selected, for example, by clicking the left button on the mouse, the playback point jumps to a point corresponding to the selected thumbnail image. This makes it possible to perform seeking during the playback operation.

Figure 20:
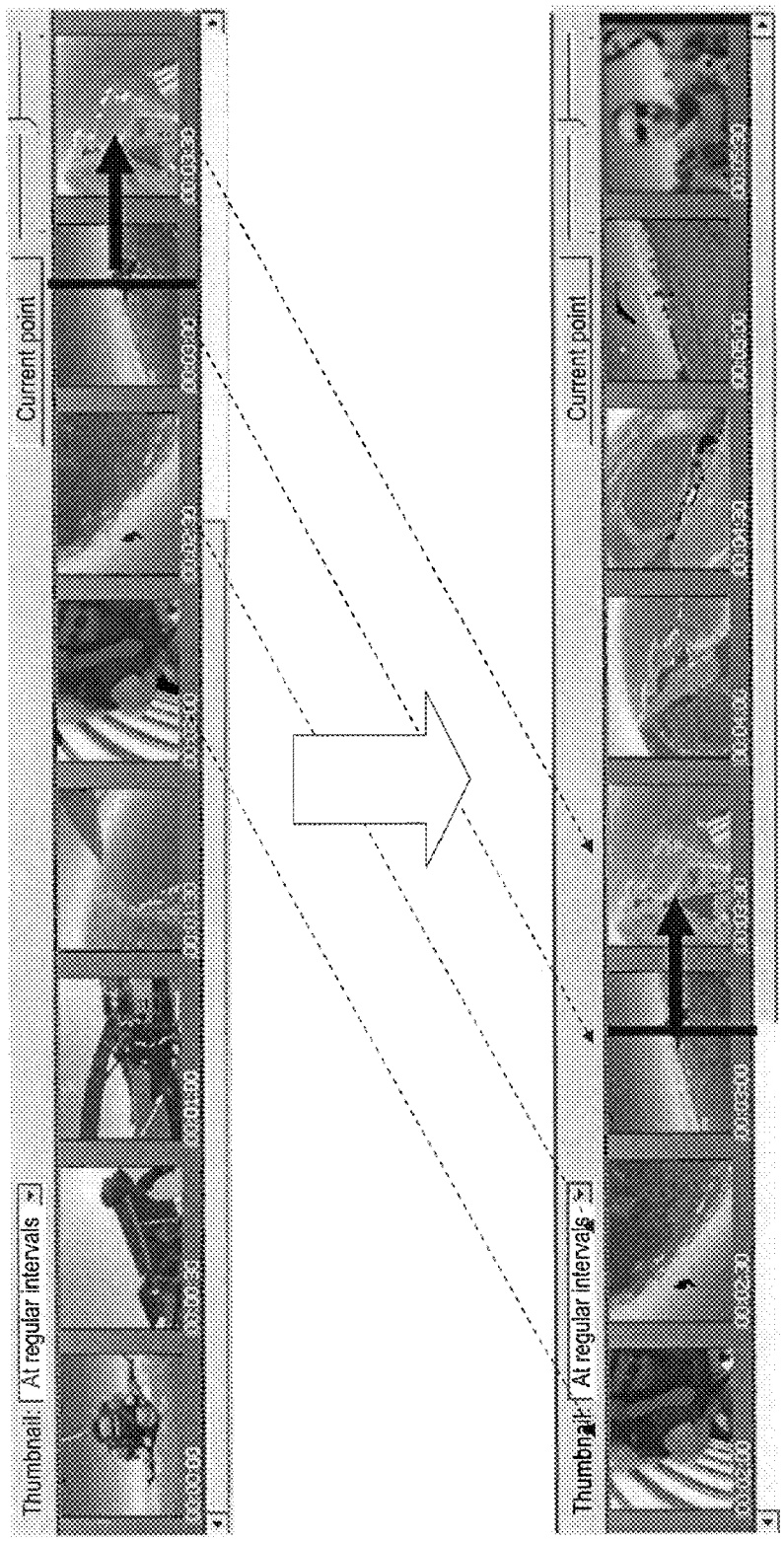
FIG. 20 is a diagram illustrating a manner in which the location of a current playback point indicator and the location of a scroll bar are automatically moved as the playback operation of a motion image proceeds.

As shown on the top of FIG. 20, as the playback of the motion image proceeds, the position of the current playback point indicator 623 is moved to the right. In a case where all thumbnail images of a motion image cannot be displayed at a time in the film roll display area 613 because of the limitation on the screen size or the like, the current playback point indicator 623 eventually goes out of the film roll display area 613 when the playback reaches a particular point of the motion image. To avoid the above problem, the scroll bar 624 is automatically adjusted such that thumbnail images on the film roll are shifted in a direction (to the left) opposite to the playback direction thereby maintaining the position of the current playback point indicator 623 within the screen.

Alternatively, the scroll bar 624 may be continuously adjusted so that the current playback point indicator 623 is always at the middle of the film roll.

Figure 21:
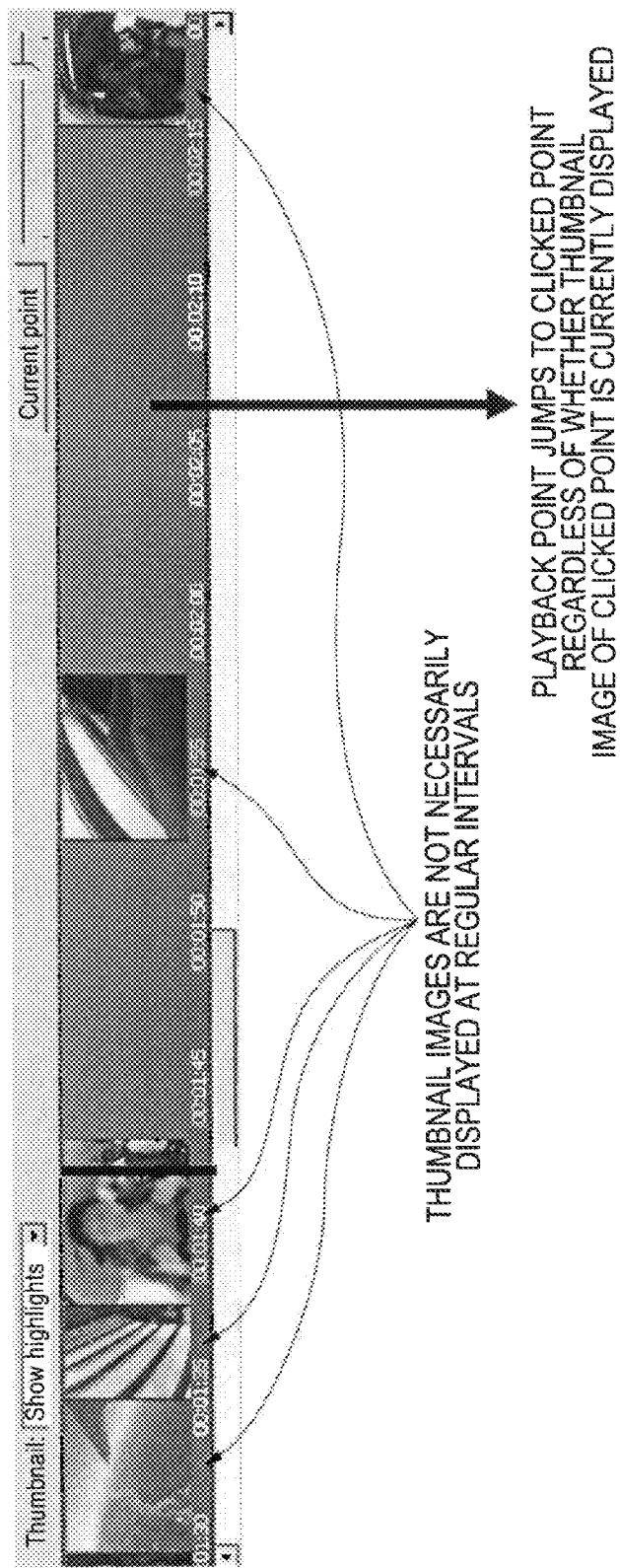
FIG. 21 is a diagram illustrating details of a film roll view area in a mode in which highlight thumbnail images are extracted from a moving image.

In the example of the film roll display area shown in FIG. 19, "At intervals of 10 sec" is selected as the method of extracting frames from a motion image in the thumbnail expansion process. In this case, thumbnail images of the motion image are placed at equal intervals on the film roll. On the other hand, in the case where "Show Highlights" is selected as the frame extraction method, thumbnail images of the motion images are placed at irregular intervals on the film roll, and thus there can be a large space between adjacent thumbnail image as in an example shown in FIG. 21. In such a state, if a point in the space where no thumbnail images are displayed is selected (clicked with the mouse), the playback point jumps to the clicked point although no thumbnail image is displayed.

In a case where a small number of highlight images are extracted from a motion image, and thus a large space occurs between thumbnail images on the film roll, the space may be interpolated with thumbnails images extracted at regular intervals.

FIG. 22 is a flow chart illustrating a process of expanding a set of thumbnail images of a motion image in the order of time on a list-of-images view screen in the form of a calendar view.

If an application of displaying content files in the calendar view is activated (step S101), a list-of-images view screen is displayed in the form of the calendar view (step S102).

In the above process, the year calendar view 510, the month calendar view 520, or the day calendar view 530 is displayed as an initial view. In any of these view forms, a user is allowed to issue a command to switch the view form, scroll the position of the calendar view, move the cursor, or other commands via the operation accepting unit 170. These operations are performed in similar manners as described above with reference to FIGS. 10 to 12.

The list-of-images view screen has the Expand button 601 and the Collapse button 602 (see FIG. 13). The current status in terms of the expansion mode is maintained until either one of these buttons is clicked (step S103).

If the Expand button 601 pressed (that is, if the answer to step S104 is YES), the selection UI 603 adjacent to the Expand button 601 is enabled and thus it becomes possible to use the pull-down menu (step S105). If a frame extraction method is selected from the pull-down menu of the selection UI 603, the mode of displaying thumbnail images along the film roll is switched in accordance with the selected frame extraction method, as described above with reference to FIG. 16.

For example, if "At intervals of 10 sec" is selected from the menu, frames are extracted at intervals of 10 seconds from a motion image, thumbnail images are produced from the extracted frames, and the resultant thumbnail images are displayed in the order of time along the film roll (step S107). In a case where "Divide into 10 segments" is selected, a specified motion images is divided into 10 segments with an equal length, frames are extracted at boundaries of these 10 segments, thumbnail images are produced from the extracted frames, and the resultant thumbnail images are displayed in the order of time along the film roll. In a case where "Show Highlights" is selected, highlight frames are extracted from a specified motion image, thumbnail images are produced from the extracted frames, and the resultant thumbnail images are displayed in the order of time along the film roll (step S108).

As long as the expansion mode is in the on state, the selection UI 603 is always in the enabled state (step S109). If a user changes the frame extraction method via the pull-down menu (that is, if the answer to step S110 is YES), the processing flow returns to step S106 to switch the mode of displaying thumbnail images along the film roll in accordance with the frame extraction method selected from the pull-down menu.

If a user selects one of the thumbnail images on the film roll (by clicking the left button on the mouse), the playback of the motion image is started from a point corresponding to the selected thumbnail image, as described above with reference to FIG. 17. FIG. 23 illustrates, in the form of a flow chart, the details of the process of starting the playback of the motion image.

In response to the selection of one of thumbnail images on the film roll, the process of playing back the motion image file is started. A motion image playback screen is opened separately from the list-of-images view screen, and thumbnail images belonging to the motion image being played back are displayed on a film roll disposed in the bottom area of the motion image playback screen (step S111).

If one of the thumbnail images on the film roll is selected for example, by clicking the left button on the mouse (that is, if the answer to step S112 is YES), the time position corresponding to the clicked thumbnail image is calculated (step S113), and the playback point jumps to the calculated point (step S114). This makes it possible to perform seeking during the playback operation.

The motion image playback screen may be formed, for example, as shown in FIG. 18. As shown in FIG. 19, the current playback point indicator 623 indicating the current playback point is displayed on the film roll. As the playback of the motion image proceeds, the position of the current playback point indicator 623 is moved in the playback direction. FIG. 24 illustrates, in the form of a flow chart, the details of the process of playing back the motion image.

If the playback of the motion image is started (step S121), the position of the current playback point indicator 623 is moved in the playback direction in synchronization with the progress of the playback operation (step S122).

Thumbnail images belonging to the motion image being played back are displayed in the form of a film roll in the bottom area of the motion image playback screen (step S123).

If one of the thumbnail images on the film roll is selected, for example, by clicking the left button on the mouse, (that is, if the answer to step S124 is YES), the time position corresponding to the clicked thumbnail image is calculated (step S125), and the playback point jumps to the calculated point.

Meanwhile, the selected thumbnail image is moved to the middle of the film roll display area (step S126), and the current playback point indicator 623 is moved to the middle of the film roll display area (step S127).

The playback of the motion image is started from the time point calculated in step S125 (step S128). Thus, it is possible to perform seeking during the playback operation.

In the case where all thumbnail images of a motion image cannot be displayed at a time in the film roll display area 613 because of the limitation on the screen size or the like, the current playback point indicator 623 eventually goes out of the film roll display area 613 when the playback reaches a particular point of the motion image. To avoid the above problem, the scroll bar 624 is automatically adjusted such that the position of the current playback point indicator 623 is maintained within the screen, as described above with reference to FIG. 20. FIG. 25 illustrates, in the form of a flow chart, the details of the process of advancing the current playback point indicator 623 during the motion image playback operation.

If the playback of the motion image is started (step S131), the position of the current playback point indicator 623 is moved in the playback direction in synchronization with the progress of the playback operation (step S132).

When the motion image playback operation further proceeds, if the current playback point indicator 623 goes out of a middle 30%-range of the film roll display area (that is, if the answer to step S133 is YES), the current playback point indicator 623 is moved to the middle of the film roll display area (step S134).

Depending on the movement of the current playback point indicator 623, the scroll bar 624 is also adjusted so that a thumbnail image exactly corresponding to or closest to the current frame being displayed is located in the middle of the film roll (step S135).

It should be understood by those skilled in the art that various modifications, combinations, sub-combinations and alterations may occur depending on design requirements and other factors insofar as they are within the scope of the appended claims or the equivalents thereof.

What is claimed is:

1. An information presenting apparatus adapted to present, to a user, information associated with each motion image stored in a storage apparatus, comprising:
    frame selection method specifying means for identifying highlighrs scenes based on evaluating audio data associated with a motion image to obtain scenes including a specified person;
    frame extraction means for extracting a plurality of representative images from the motion image in accordance with the identified highlight scenes;
    motion image thumbnail image management means for producing thumbnail images of each of the extracted representative images, relating each thumbnail images to a playback position in the motion image, and managing the thumbnail images as a set of motion image thumbnail images in accordance with a capturing time at which the motion image was captured; and
    image drawing means for drawing information associated with each motion image stored in the storage apparatus, at a location corresponding to the capturing time of the motion image, on a calendar,
    wherein when the image drawing means presents the information associated with each motion image stored in the storage apparatus on the calendar, the image drawing means draws at least one thumbnail image in the set of motion image thumbnail images, for each motion image, in an expanded form in which the at least one thumbnail image is arranged in time order, and
    wherein the audio data associated with the motion image is evaluated to obtain highlight scenes including a frame at which a zoom operation occurs.

2. The information presenting apparatus according to claim 1, wherein the frame extraction means extracts the plurality of representative images at regular intervals.

3. The information presenting apparatus according to claim 1, further comprising operation accepting means for accepting an operation performed by the user.

4. The information presenting apparatus according to claim 3, further comprising motion image playback means for, in response to selecting the at least one thumbnail image drawn by the image drawing means by the user via the operation accepting means, playing back a motion image starting from a playback position corresponding to the selected thumbnail image.

5. The information presenting apparatus according to claim 3, wherein the image drawing means draws the at least one thumbnail image such that when the information associated with the motion image stored in the storage apparatus is presented on the calendar, the image drawing means initially draws a single thumbnail image that is expanded into a plurality of thumbnail images included in a set of motion image thumbnail images associated with the motion image or such that a plurality of expanded motion image thumbnail images are collapsed into a single thumbnail image, depending on a thumbnail image display mode specified by the user via the operation accepting means.

6. The information presenting apparatus according to claim 5, wherein when the image drawing means draws the at least one thumbnail image included in the set of motion image thumbnail images in the expanded manner in the time order, the image drawing means draws the the at least one thumbnail image in a manner in which a film roll expands along which the thumbnail images included in the set of motion image thumbnail images are presented in an expanded manner in the order.

7. The information presenting apparatus according to claim 6, wherein the image drawing means expands the thumbnail images in an animation format that indicates the manner in which the film roll expands, so that the progress of drawing the thumnail images in the expanded manner is displayed to the user.

8. The information presenting apparatus according to claim 1, wherein the highlight scenes are identified further based on evaluating image data associated with the motion image.

9. An information presenting method of presenting, to a user, information associated with each motion image stored in a storage apparatus, comprising the steps of:
    identifying highlight scenes based on evaluating audio data associated with a motion image to obtain scenes including a specified person;
    extracting a plurality of representative images from the motion image in accordance with the identified highlight scenes;
    managing motion image thumbnail images, by producing thumbnail images of the each of the extracted representative images, relating each thumbnail images to a playback position in the motion image, and managing the thumbnail images as a set of motion image thumbnail images in accordance with a capturing time at which the motion image; and
    drawing an image of information associated with each motion image stored in the storage apparatus, at a location corresponding to the capturing time of the motion image, on a calendar,
    wherein in the image drawing step, when the information associated with each motion image stored in the storage apparatus is presented on the calendar, at least one thumbnail image in the set of motion image thumbnail images associated with the motion image are expanded in time order, and
    wherein the audio data associated with the motion image is evaluated to obtain highlight scenes including a frame at which a zoom operation occurs.

10. The information presenting method according to claim 9, wherein the highlight scenes are identified further based on evaluating image data associated with the motion image.

11. The information presenting apparatus according to claim 10, wherein the audio data associated with the motion image is evaluated to obtain highlight scenes including a face image of the specified person.

12. A non-transitory computer readable storage medium storing a computer program executable by a computer to perform a process of presenting, to a user, information associated with each motion image stored in a storage apparatus, the process comprising the steps of:
    identifying highlight scenes based on evaluating audio data associated with a motion image to obtain scenes including a specified person;
    extracting a plurality of representative images from the motion image in accordance with the identified highlight scenes;
    managing motion image thumbnail images, by producing thumbnail images of the each of the extracted representative images, relating each of the thumbnail images to a playback position in the motion image, and managing the thumbnail images as a set of motion image thumbnail images in accordance with a capturing time at which the motion image; and drawing an image of information associated with each motion image stored in the storage apparatus, at a location corresponding to the capturing time of the motion image, on a calendar, wherein in the image drawing step, when the information associated with each motion image stored in the storage apparatus is presented on the calander, at least one thumbnail image in the set of motion image thumbnail images associated with the motion image are expanded in the time order, and wherein the audio data associated with the motion image is evaluated to obtain highlight scenes including a frame at which a zoom operation occurs.

13. The non-transitory computer readable storage medium according to claim 12, wherein the highlight scenes are identified further based on evaluating image data associated with the motion image.

14. The information presenting apparatus according to claim 13, wherein the audio data associated with the motion image is evaluated to obtain highlight scenes including a frame at which a scene change occurs.

15. An information presenting apparatus adapted to present, to a user, information associated with each motion image stored in a storage apparatus, comprising:

frame selection method specifying unit adapted to identify highlight scenes based on evaluating audio data associated with a motion image to obtain scenes including a specified person;

frame extraction unit adapted to extract a plurality of representative images from the motion image in accordance with the identified highlight scenes;

motion image thumbnail image management unit adapted to produce thumbnail images of each of the extracted representative images, relating each of the thumbnail images to a playback position in the motion image, and managing the thumbnail images as a set of motion image thumbnail images in accordance with a capturing time at which the motion image was captured; and image drawing unit adapted to draw information associated with each motion image stored in the storage apparatus, at a location corresponding to the capturing time of the motion image, on a calendar, wherein when the image drawing unit presents the information associated with each motion image stored in the storage apparatus on the calendar, the image drawing unit draws at least one thumbnail image in the set of motion image thumbnail images, for each motion image, in an expanded form in which the at least one thumbnail image is arranged in time order, and wherein the audio data associated with the motion image is evaluated to obtain highlight scenes including a frame at which a zoom operation occurs.

16. The information presenting apparatus according to claim 15, wherein the highlight scenes are identified further based on evaluating image data associated with the motion image.

* * * * *